United States Patent
Santiago et al.

(10) Patent No.: US 7,799,453 B2
(45) Date of Patent: Sep. 21, 2010

(54) FUEL CELL WITH ELECTROOSMOTIC PUMP

(75) Inventors: Juan Santiago, Fremont, CA (US); Jonathan Posner, Menlo Park, CA (US); Friedrich B. Prinz, Woodside, CA (US); Tibor Fabian, Menlo Park, CA (US); John Eaton, Stanford, CA (US); Suk-Won Cha, Stanford, CA (US); Cullen Buie, Stanford, CA (US); Daejoogn Kim, Stanford, CA (US); Hideaki Tsuru, Nerima-ku (JP); Jun Sasahara, Kawagoe (JP); Tadahiro Kubota, Asaka (JP); Yuji Saito, Palo Alto, CA (US)

(73) Assignees: The Board of Trustees of the Leland Stanford Junior University, Palo Alto, CA (US); Honda Motor Co., Ltd., Tokyo (JP)

( * ) Notice: Subject to any disclaimer, the term of this patent is extended or adjusted under 35 U.S.C. 154(b) by 1389 days.

(21) Appl. No.: 10/912,527

(22) Filed: Aug. 4, 2004

(65) Prior Publication Data

US 2006/0029851 A1    Feb. 9, 2006

(51) Int. Cl.
  *H01M 2/00*    (2006.01)
  *H01M 2/02*    (2006.01)
  *F04B 37/02*   (2006.01)
  *F04F 99/00*   (2009.01)
(52) U.S. Cl. .......................................... 429/34; 417/48
(58) Field of Classification Search ................... 429/13, 429/34; 417/48
  See application file for complete search history.

(56) References Cited

U.S. PATENT DOCUMENTS

| | | | |
|---|---|---|---|
| 5,322,744 A | 6/1994 | Koseki | 429/13 |
| 5,534,363 A | 7/1996 | Sprouse et al. | 429/34 |
| 5,773,160 A | 6/1998 | Wilkinson et al. | 429/13 |
| 5,952,119 A | 9/1999 | Wilson | 429/34 |
| 6,117,577 A | 9/2000 | Wilson | 429/17 |
| 6,485,851 B1 | 11/2002 | Narayanan et al. | |
| 6,503,432 B1 * | 1/2003 | Barton et al. | 264/173.16 |
| 6,503,651 B1 | 1/2003 | Nguyen | 429/34 |
| 7,147,955 B2 | 12/2006 | Adams | |
| 2003/0031908 A1 * | 2/2003 | Bostaph et al. | 429/30 |

(Continued)

OTHER PUBLICATIONS

Mutlu et al., "Micromachined Porous Polymer for Bubble Free Electro-osmotic Pump," 2002, IEEE.*

(Continued)

*Primary Examiner*—Dah-Wei D Yuan
*Assistant Examiner*—Steven Scully
(74) *Attorney, Agent, or Firm*—Lumen Patent Firm

(57) ABSTRACT

Water flooding at the cathode of a fuel cell is a common problem in fuel cells. By integrating an electroosmotic (EO) pump to remove product water from the cathode area, fuel cell power can be increased. Integration of EO pumps transforms the designs of air channel and air breathing cathodes, reducing air pumping power loads and increasing oxidant transport. Hydration of gas streams, management of liquid reactants, and oxidant delivery can also be accomplished with integrated electroosmotic pumps. Electroosmotic pumps have no moving parts, can be integrated as a layer of the fuel cell, and scale with centimeter to micron scale fuel cells.

47 Claims, 25 Drawing Sheets

U.S. PATENT DOCUMENTS

| | | | |
|---|---|---|---|
| 2003/0062149 A1* | 4/2003 | Goodson et al. | 165/104.11 |
| 2003/0165720 A1 | 9/2003 | DeFilippis | 429/13 |
| 2003/0215686 A1 | 11/2003 | DeFilippis et al. | 429/34 |
| 2003/0232203 A1* | 12/2003 | Mutlu et al. | 428/451 |
| 2004/0074784 A1* | 4/2004 | Anex et al. | 205/674 |

OTHER PUBLICATIONS

Mutlu, S. et al. Micromachined Porous Polymer For Bubble Free Electro-osmotic Pump The Fifteen IEEE International Conference on Jan. 20-24, 2002, pp. 19-23 US 2004/0074784 A1 (Anex et al) 22 Apr. 22, 2004, (Jan. 22, 2004), paragraph 80.

* cited by examiner

FUEL CELL WITH ELECTROOSMOTIC PUMP

FIELD

The invention relates to fuel cells, and, more particularly, to fuel cell water, oxidant stream, and liquid reactant management.

BACKGROUND

Proton exchange membrane fuel cells have shown great promise as an energy source for devices ranging from hand held electronics, automobiles, to small scale fixed power units due to their large energy density, low temperature operation, and inert reaction products. A fuel cell (FC) operates on the principle of extracting energy from the conversion of high energy state reactant molecules to lower energy state product molecules via catalysts. For hydrogen fuel cells (HFC's), hydrogen is combined with oxygen to form water, heat, and electrical energy. The chemical reactions involved take place at two catalyst sites, the anode and cathode. A HFC produces electrical energy without producing greenhouse gases or pollution.

Proton exchange membrane fuel cells typically have an anode, an ion selective membrane, and a cathode. The anode and cathode usually have a hydrophobic gas diffusion layer, a catalyst layer, and a current collection layer. The ion selective membrane is designed to allow the transport of protons and has high resistance to electron conduction and transport of anions.

The net chemical reactions for HFC's are,

  [1]

  [2]

Eq. [1] occurs at the anode catalyst layer and Eq. [2] occurs at the cathode catalyst layer. While the basic principles of HFC operation are relatively straightforward, fuel cells have practical operational issues that limit their performance.

FIG. 1 shows an example of a prior art hydrogen fuel cell 100. The fuel cell 100 comprises a reactant duct 102, an anode 104, an ion permeable membrane 106, a cathode 108, and an oxidant duct 110. The membrane 106 is a poor electrical conductor and electrons travel through the external load 114 producing electrical power. An electrical current 112 travels from the anode 104 through the load 114 to the cathode 108. The load 114 is the device that the fuel cell is powering, such as a battery, an electric motor or an electronic device. The input reactant 116, in this case hydrogen, enters the reactant duct 102. The input reactant 116 can be pure dry hydrogen or hydrogen humidified with water vapor. The unused input reactant 116 exits as the output reactant 120. Ideally, in the case of a hydrogen fuel cell 100, the output reactant stream 120 would have small partial pressure of hydrogen as compared to the input reactant 116. The input oxidant 118 enters the oxidant duct 110. The oxidant stream 118 is pure oxygen, surrounding air with some fraction of oxygen, or one of the aforementioned streams humidified with water vapor. Unused oxidant and the unconsumed carrier gases (in the case of air: $N_2$, $CO_2$, Ar, etc.) exit the oxidant duct 110 along with product water 124 as the oxidant output stream 122. The product water may leave the fuel cell as both a vapor or a liquid depending on the thermodynamic conditions.

For the purposes of this application, oxygen enriched air (which includes pure oxygen) may be used interchangeably with regular air as an oxidant source. Those skilled in the art realize that the oxidant flow rate of pure oxygen will be roughly one fifth that of standard air to achieve the same fuel cell current density. Thus, when a figure shows $O_2$, the oxidant supply may be either oxygen enriched air or regular air.

One example of a suitable membrane 106 is an ion exchange polymer or polymer exchange membrane (PEM) made from polyperfluorosulfonic acid (available as Nafion membrane by DuPont, USA). Ion transport occurs along pathways of ionic networks established by the anionic (sulfonic acid anion) groups that exist within the polymer. Liquid water is desired around ionic sites in the polymer to form conductive pathways for ionic transport. The ionic conductivity of this type of the PEM 106 is therefore dependent on proper hydration of the membrane. The ionic conductivity of the membrane 106 increases with water content. Optimum hydration of the membrane 106 is important to fuel cell performance. For this reason, water vapor is often carried in the reactant streams to prevent drying out of the PEM membrane.

Several transport mechanisms affect hydration of the membrane 106. The water transport mechanisms in typical fuel cells are evaporation, condensation, diffusion, and electroosmotic drag. The evaporation and condensation rates of water between the membrane 106 and the reactant streams (116, 118) depend on the (1) the partial pressures of water vapor in the reactant streams, (2) the gas and membrane temperatures, (3) the gas flow rates and velocities, and (4) the hydration state of the membrane. Typically, reactant streams are humidified to inhibit the PEM from drying out. During operation, water is electroosmotically dragged from the anode 104 through the PEM 106 towards the cathode 108 by hydrogen water compounds (for example, hydronium compounds such as $(H_3O)^+$). In this process, water molecules are dragged through the membrane 106 by hydrogen protons. Studies suggest that each hydrogen ion transport induces the transport of 1-5 water molecules towards the cathode 108. Molecular diffusion results in a flux of water aligned with negative concentration gradients within the membrane 106. Since water is electroosmotically dragged towards the cathode and water is produced at the cathode, molecular diffusion typically results in some diffusive transport of water back towards the anode. Maintaining a proper level of hydration of the membrane 106 at all times is challenging as water transport mechanisms are strongly coupled. Membrane hydration can vary spatially even within a single fuel cell flow structure. Some systems use long, serpentine-like oxidant channels to drive out water. In such devices, the fraction of water content along the channel length increases steadily in the direction of the outlet.

Another common type of fuel cell is the direct methanol fuel cell (DMFC). A DMFC uses a methanol-water mixture as a reactant stream. The cathode side of the DMFC works the same as for a HFC. The net chemical reactions in a DMFC are summarized in the following equations:

  [3]

  [4]

Eq. [3] occurs at the anode catalyst layer and Eq. [4] occurs at the cathode catalyst layer. Advantages of DMFC's include: higher energy density than $H_2$, ease of storage, and rapid refueling. These advantages stem from the fact that methanol is primarily a liquid at room temperature and pressure. Disadvantages of DMFC's include: $CO_2$ product gases and reduced power density. DFMC's are primarily being developed for portable electronic devices.

FIG. 2 shows an example of a prior art direct methanol fuel cell 200. The fuel cell 200 is similar to the hydrogen fuel cell 100 shown in FIG. 1, except that the reactant input 216 comprises liquid methanol and water. The mixture of unconsumed reactants and carbon dioxide products 220 leaves the anode region via a duct 102. As in HFC's, DMFC also use air as the oxidant stream thus $N_2$ and other trace gases will be present in the oxidant streams. The anode exit stream 220 will be methanol, depleted water, and $CO_2$.

In both HFC's and DMFC's the product water at the cathode 108 can inhibit oxygen transport and reduce cell potential at higher current densities. One current method of dealing with product water is to remove the water with the oxidant stream. This method employs interdigitated flow distributors or serpentine channels to reduce the effect of electrode flooding. Experiments have shown that 2-60 times the stoichiometric rate of oxidant is typically used to reduce the detrimental affects of flooding. Serpentine and interdigitated channels generate large pressure drops and require large parasitic oxidant pumping powers. The oxidant pump power is drawn from the fuel cell and reduces the net power output of the fuel cell. Typically for kW sized fuel cells, 25% of the fuel cell power is lost to parasitic equipment such as oxidant pumps.

SUMMARY

This document describes a system that uses one or more electroosmotic pumps to transport liquids. This document also describes several methods related to fuel cells including active feedback control.

DESCRIPTION

This document describes a system that uses one or more electroosmotic pumps to transport liquids for fuel cells to manage the transport of water, liquid fuel mixtures, and oxidant streams. This document also describes several methods related to fuel cells including active feedback control. Electroosmotic pumps, sometimes referred to as electrokinetic pumps, are devices that generate both liquid flow rate and significant driving pressures using electroosmosis through micron sized pores or channels. Electroosmotic pumps have no moving parts and scale in dimension from microns to meters. Integration of electroosmotic pumps with fuel cells can improve the efficiency, stability, and power density of fuel cells. Electroosmotic (EO) pumps may be incorporated with fuel cells as an integrated layer of a cell or as an external device. EO pumps can be used to remove product water from the cathode to reduce the effects of flooding. The removed water can be used to humidify dry reactant streams during operating conditions when the PEM is dry, such as startup or with dry reactant streams, or can be used to directly humidify the PEM. Product water can also be recycled into the methanol-water mixture for a DMFC. An electroosmotic pump may also be used to transport liquid reactant mixtures, in the case of DMFC, and to displace air as a reactant at the cathode.

Figure 1:
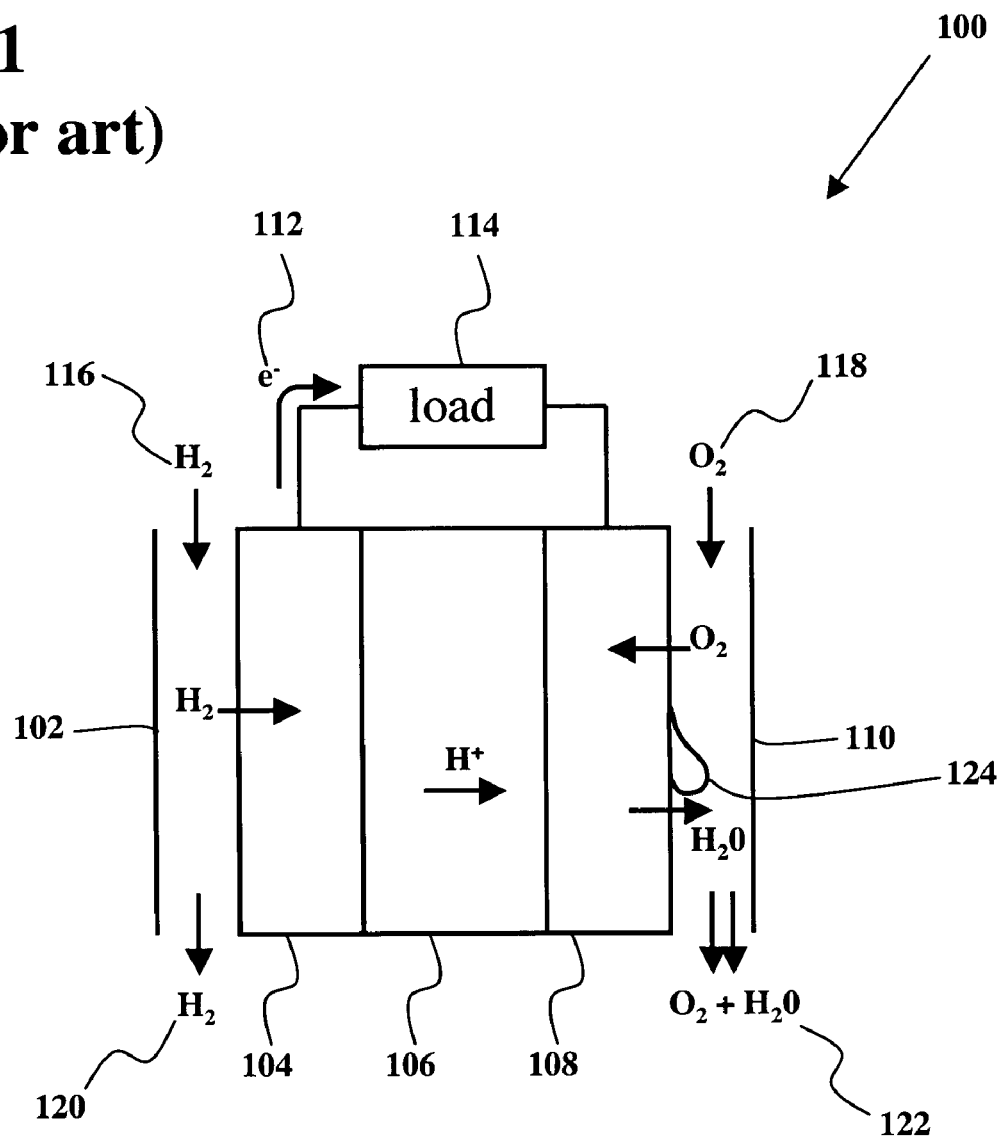
FIG. 1 shows an example of a prior art hydrogen fuel cell.
Figure 2:
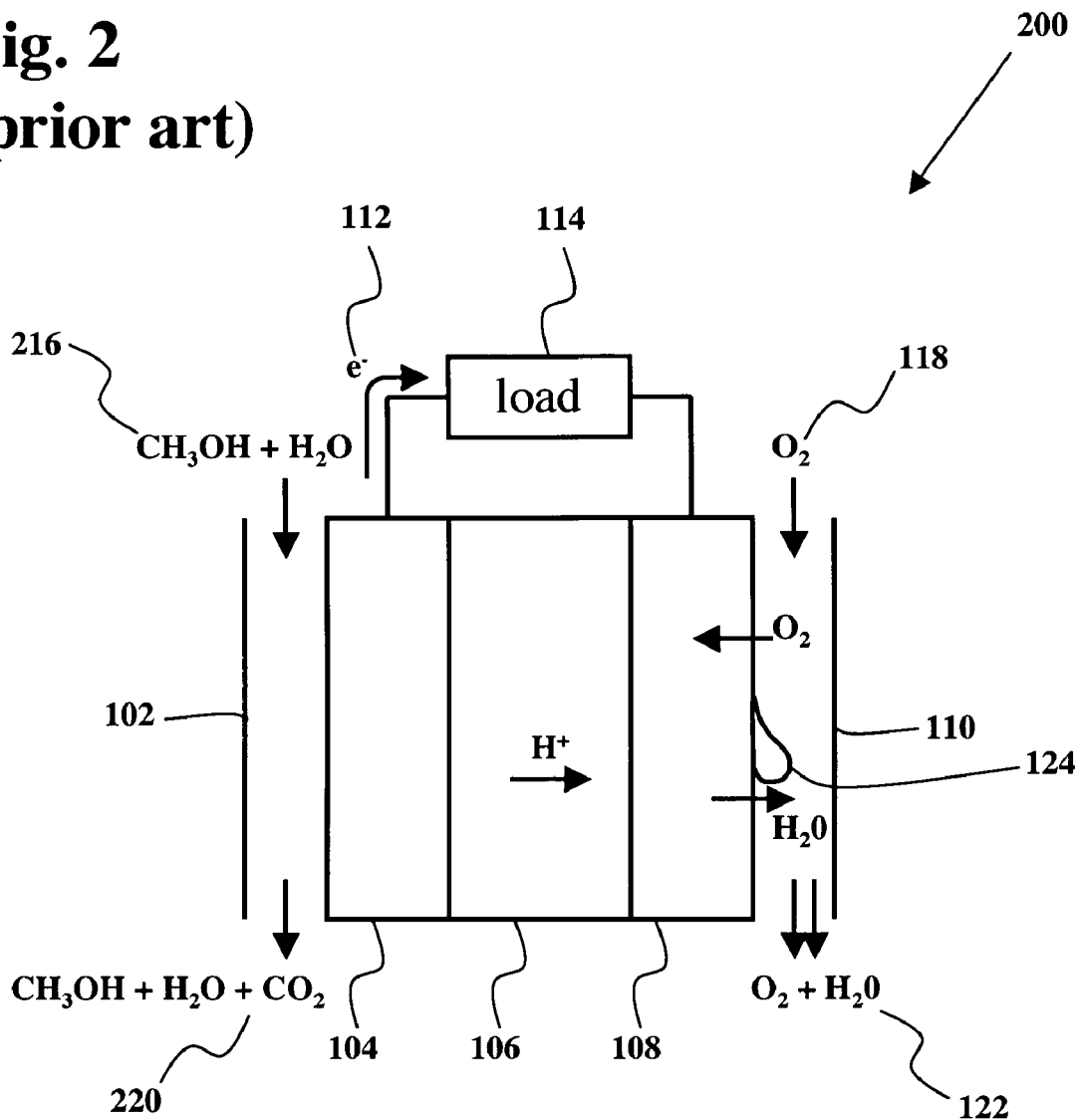
FIG. 2 shows an example of a prior art direct methanol fuel cell.
Figure 3:
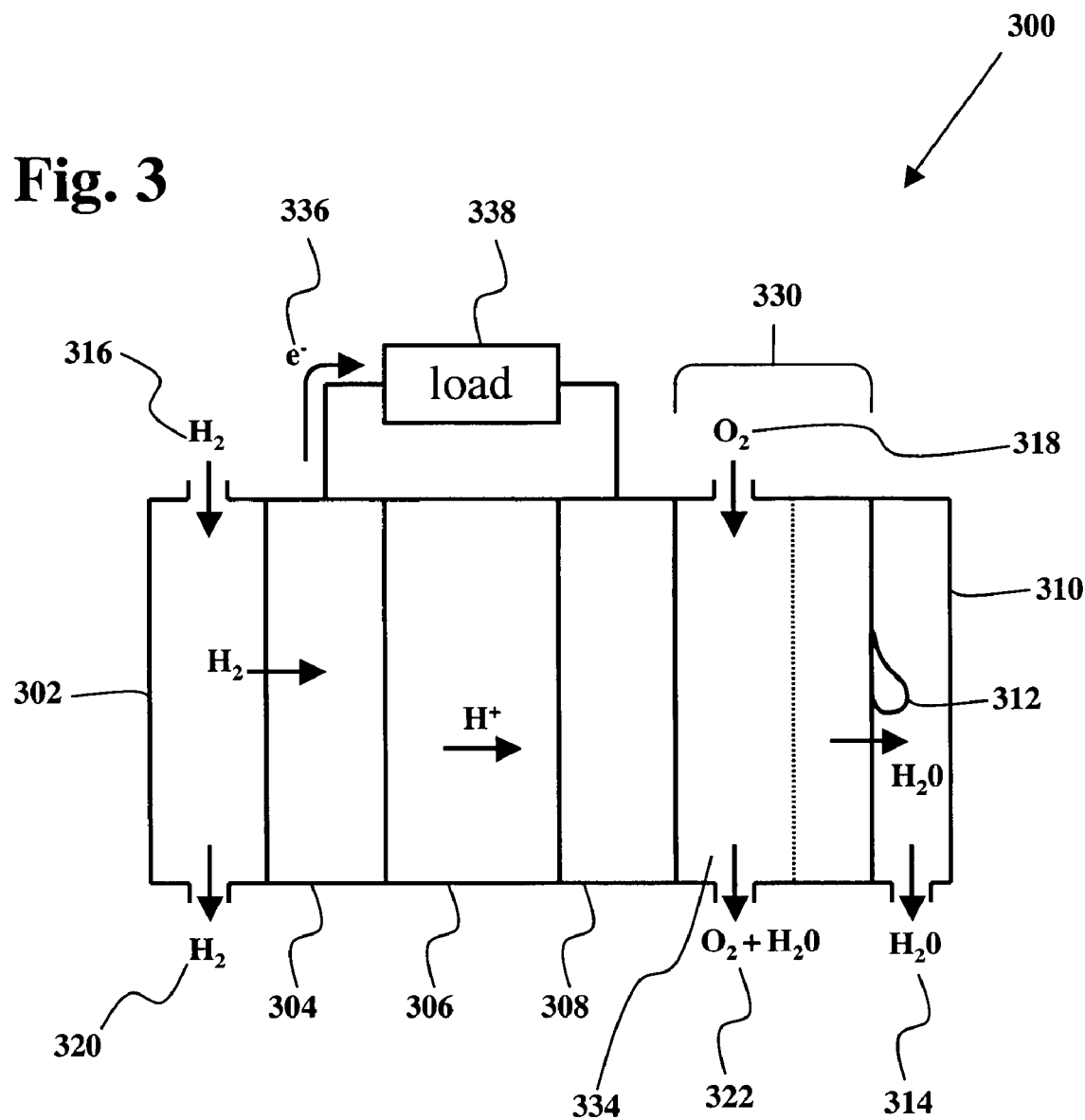
FIG. 3 shows an example of a hydrogen fuel cell with an electroosmotic pump.

FIG. 3 shows an example of a hydrogen fuel cell with an integrated electroosmotic pump. The hydrogen fuel cell 300 contains an electroosmotic pump 330 layer in between the cathode 308 layer and the output water duct 310. The pump 330 contains one or more channels 334 for supplying the input oxidant 318 to the cathode 308. Output oxidant 322 exits the pump 330 via the channel 334. The pump 330 transports product water 312 to or from the cathode 308 into or from the duct 310. Excess water 314 exits the system. An electrical current 336 travels from the anode 304 through the load 338 to the cathode 308. The duct 302 supplies a reactant 316 to the anode 304. The unused reactant 320 exits the duct 302.

Integrating an electroosmotic pump 330 with a fuel cell can remove water flooding the cathode and may increase the fuel cell potential 300 at significant current loads. In addition, the oxidant flow rate can be reduced towards the rate required by the stoichiometry of the system. With the incorporation of an EO pump, oxidant delivery channels designs are not limited to those that mitigate cathode flooding, such as serpentine and interdigitated channels designs. For these reasons, integration of an EO pump reduces the total pumping power required. The power requirements of the electroosmotic pump 330 are small compared to the power production of the fuel cell 300. Estimates for the fuel cell power and power consumed by electroosmotic pumps can be obtained from existing models [Larminie & Dicks, Yao et al.]. For example, a fuel cell 300 producing 500 mW of power at 0.5 V and 1 A, will produce about 5.7 µL/min of water [Larminie & Dicks] and will consume about 2.5 µW of power to remove it using an EO pump 330 [ref Yao]. In contrast, in a miniaturized fuel cell with an air pump that clears product water, the air pump can easily consume more than half of the power produced by the fuel cell.

The models from Larminie & Dicks are published by J. Wiley (2003) in "Fuel Cell Systems Explained", 2$^{nd}$ Edition, and are hereby incorporated by reference. Similarly, the models from S. Yao and J. G. Santiago are published in *Journal of Colloid and Interfacial Science* (2003) titled "Porous Glass Electroosmotic Pumps: Theory," and are hereby incorporated by reference.

Figure 4:
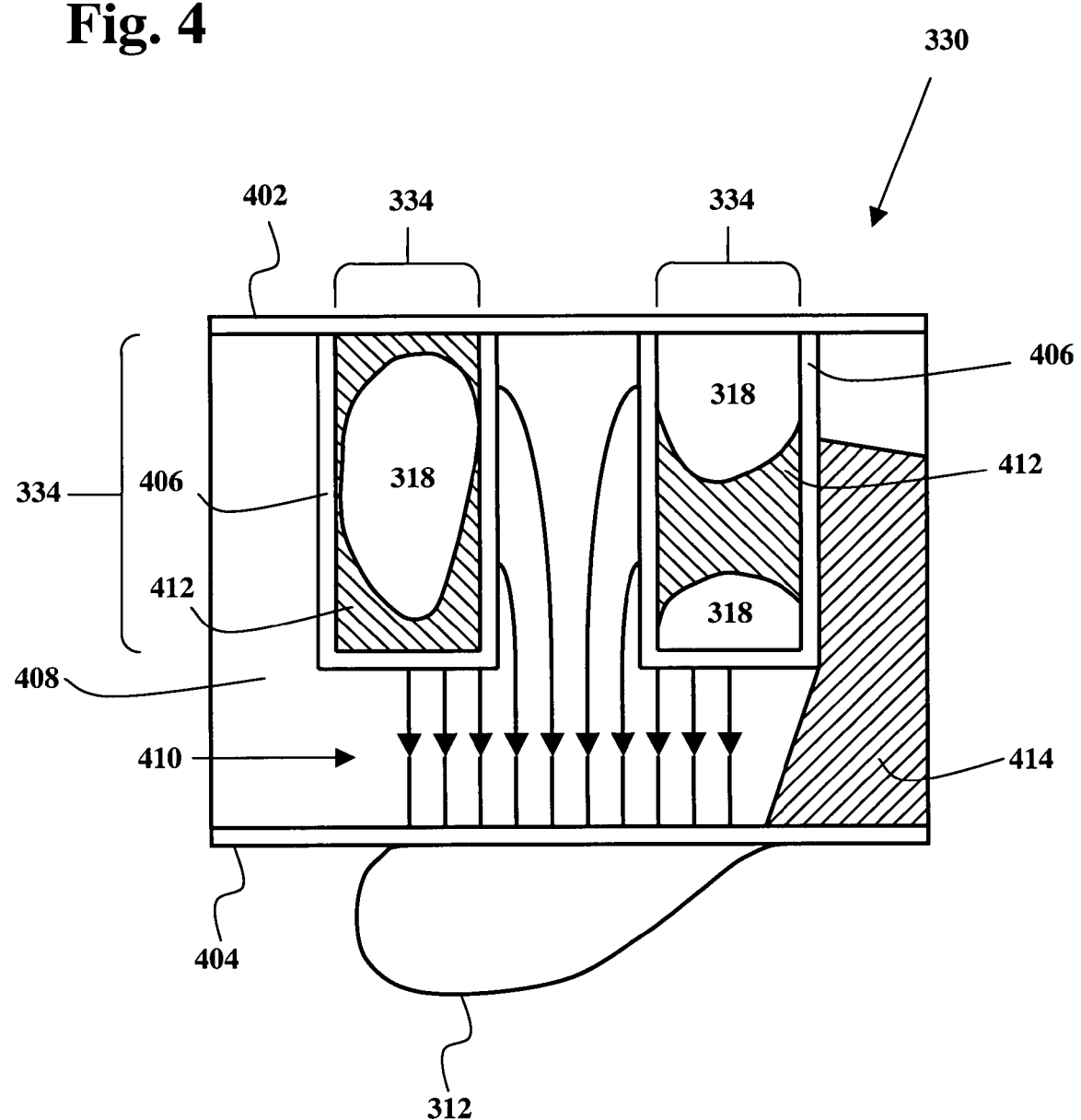
FIG. 4 shows an example of a cross section of an electroosmotic pump with oxidant channels.

FIG. 4 shows an example of a cross section of an electroosmotic pump 330 with reactant delivery channels 334. This view is looking down on the pump 330 as shown is FIG. 3. The pump 330 may include the porous substrate 408, one or more channels 334, a pump anode 402, and a pump cathode 404. The pump anode 402 and pump cathode 404 are interchangeable as their designation as a cathode or anode depends on the bias of the applied electrical potential. The channels 334 and the pump electrodes 402, 404 may have a porous, electrically conductive lining 406. Typically the porous conductive lining is made of platinum because it is inert. Also shown is product water 412 and electrical field lines 410. Inside of the channels 334 is water 412 and regions of oxidant flow 318. The water 412 in the channels 334 follows the electrical field lines 410 from the channels 334 to the outside surface of the cathode 404 via electro-osmotic forces. The approximate field lines shown 410 in FIG. 4 are a general characterization and the actual field lines depend on the precise porous substrate geometry 408, the pump anode 402 and cathode 404 geometry, the pattern and conductivity of the porous conductive layer 406, the water content in the porous substrate, and the applied potential. The pump anode 402, cathode 404, and porous conductive layer need not be continuous and may be made be patterned in sections. Each section may have an independent electrical potential applied to it. The pump anode 402 may optionally be the cathode 308 or anode 104 of the fuel cell 300 shown in FIG. 3. Using the cathode 308 or anode 104 of the fuel cell 300 as the pump anode 402 or cathode 404 reduces the number of layers required in a fuel cell EO pump system 300.

Figure 5:
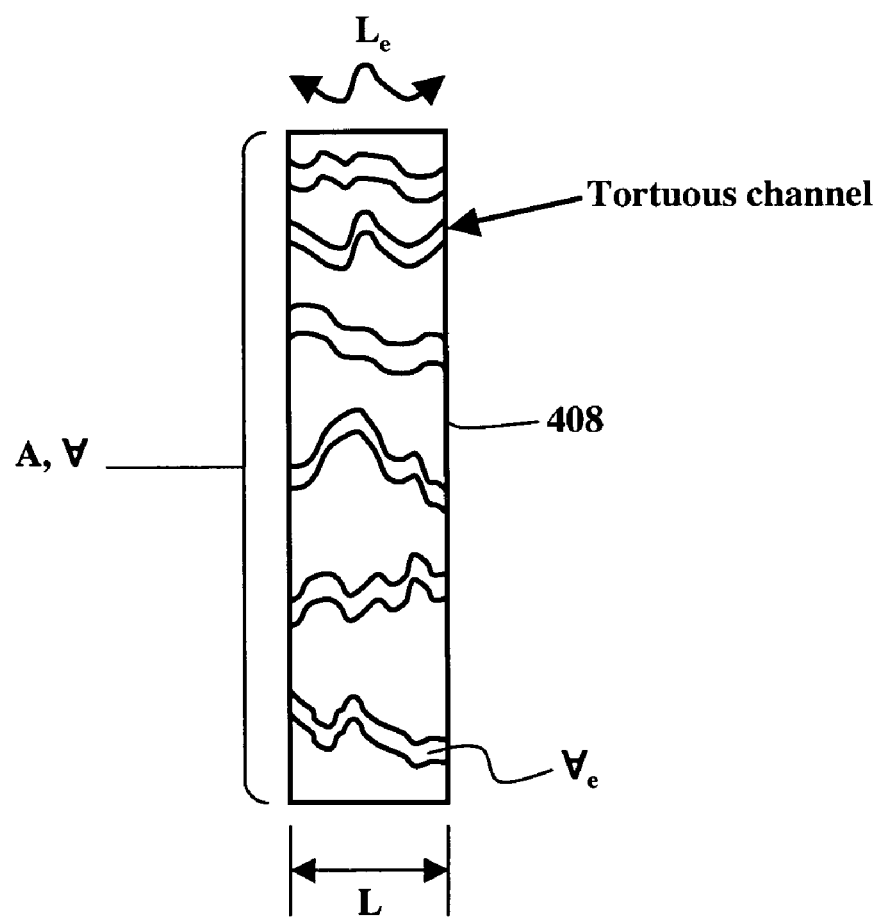
FIG. 5 shows a cross section of an electroosmotic pump substrate.

FIG. 5 shows a cross section of an electroosmotic pump substrate. The substrate 408 has a length L, an area A, a volume $\forall$, and average channel length $L_e$, and a total channel volume $\forall_e$. Specifically pointed out is one channel labeled tortuous channel.

Figure 6:
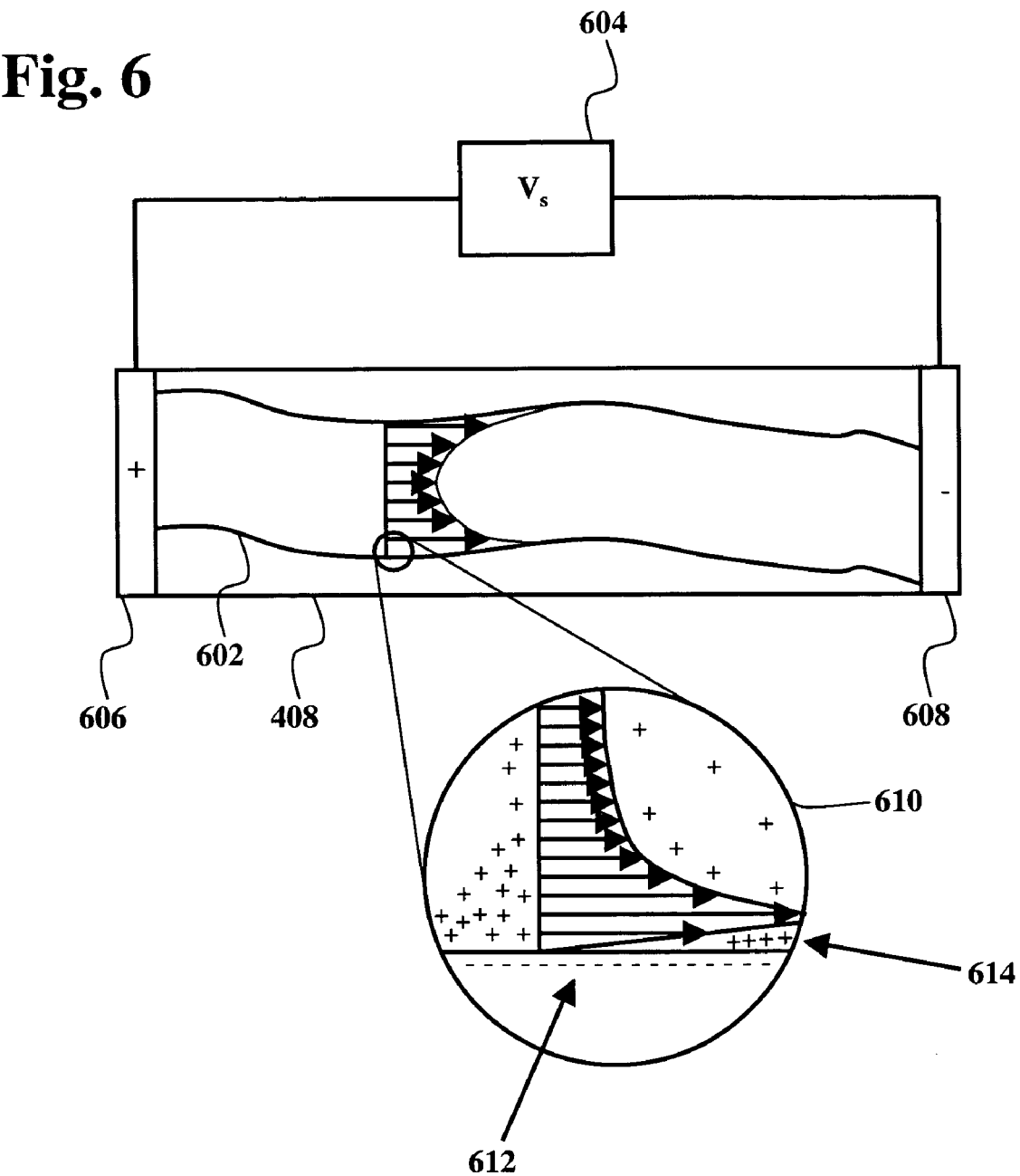
FIG. 6 shows an example of the operation principles of an electroosmotic pump.

FIG. 6 shows an example of the operative principles of an electroosmotic pump. Shown is a tortuous channel 602 (which can also be a pore), a voltage source 604 and anode 606, a cathode 608, a magnified zone 610, the charged pore wall 612, and an electric double layer 614 in the electrolyte. The arrows represent proportional electrical body forces on the electrolyte.

Electroosmotic pumps compatible with fuel designs can be fabricated using porous borosilicate glass frits (Robu Glasfilter-Geraete GmbH, Germany), sintered glass, porous silicon with a thin electrically insulating oxide layer on the surface, glass fiber material (including glass fiber filter paper), fiberglass, aluminum oxide, porous fused silica, and porous polymer layers. An exemplary pumping medium has a thickness of 1-4 mm, a porosity of approximately 0.4, a tortuosity of about 1.4, and pore sizes that range from 0.6-1.2 μm. It is advantageous for the pumping medium to be highly hydrophilic such that it absorbs water until saturated. Liquid water is initially transported away from the fuel cell cathode surface or out of the gas diffusion layer by capillary forces induced by the high surface area hydrophilic porous pumping medium. The water will continue to wet the surface of the porous material until the circuit between the pump anode 402 and cathode 404 of the electroosmotic pump 330 is completed. In this manner, the pump is self-priming. Once the pumping substrate 408 is primed in this way, electroosmotic forces will drive the water to or from the fuel cell cathode 308 or anode 104 of the fuel cell 300. The flow of water is aligned with the electric field lines 410 that are shown in FIG. 4. Once the bridge of water 414 in the pumping medium is broken, current flow across the pump stops and the pump does not consume any power. In this manner, the pump 330 is self regulating. The voltage required for operation of an electroosmotic pump is generally in the range of 2-100 V.

Figure 7A:
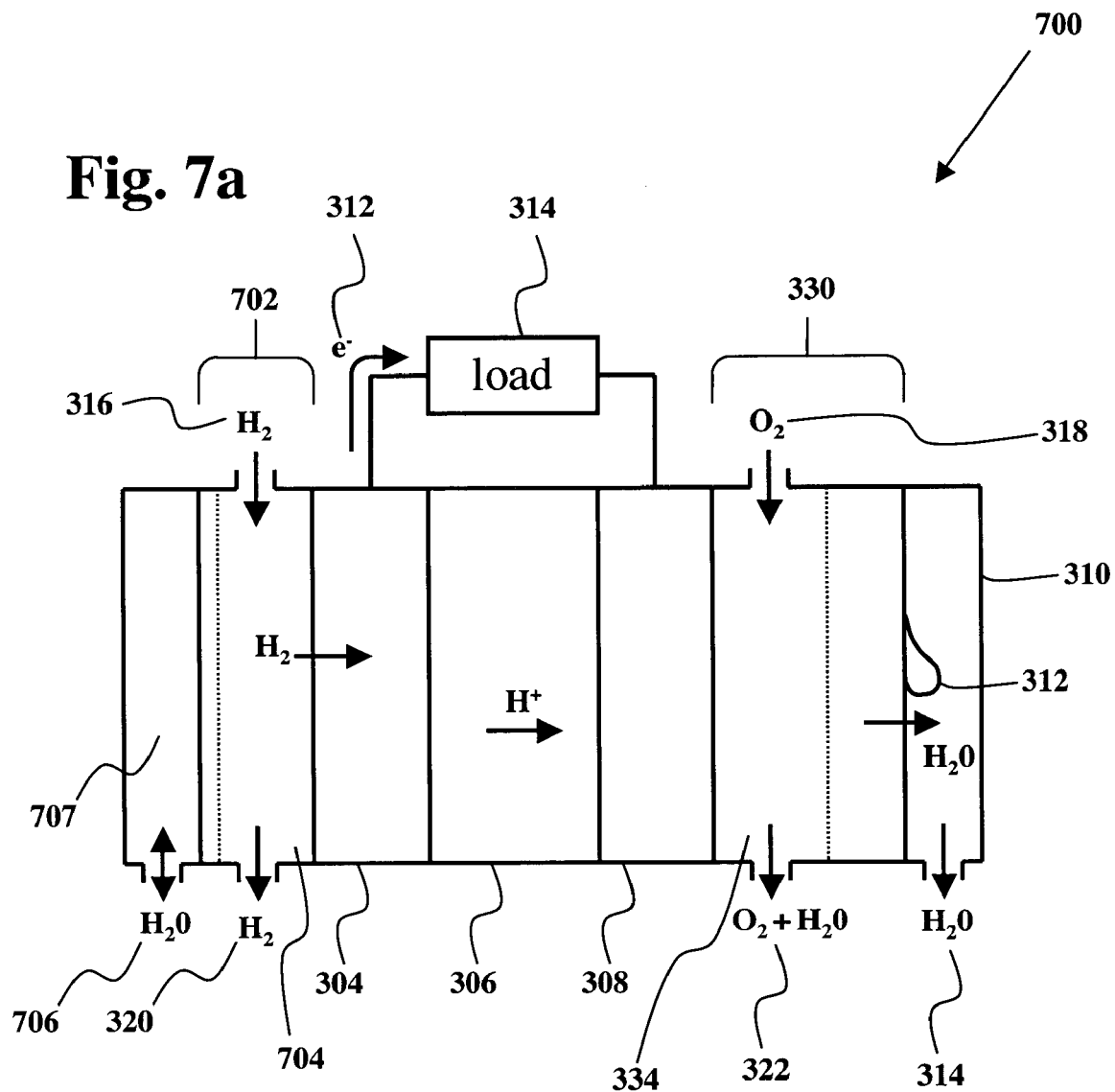
FIG. 7A shows an example of a hydrogen fuel cell with an electroosmotic pump.

FIG. 7A shows an example of a hydrogen fuel cell with an electroosmotic pump. The fuel cell 700 is similar to that shown in FIG. 3, but with the addition of a second electroosmotic pump 702, which may have at least one channel 704 for the introduction and flow of hydrogen stream. The pump allows water 706 to be introduced or removed from or to an open water reservoir 707 to maintain proper hydration of the fuel membrane 106. In addition, the pump 702 can be used as a method to humidify a dry hydrogen stream 116 by pumping water from the reservoir 707 to a region in contact with dry hydrogen. Conversely, the pump 702 can remove excess water from delivery channels 704 that has condensed from humidified hydrogen streams 116.

Figure 7B:
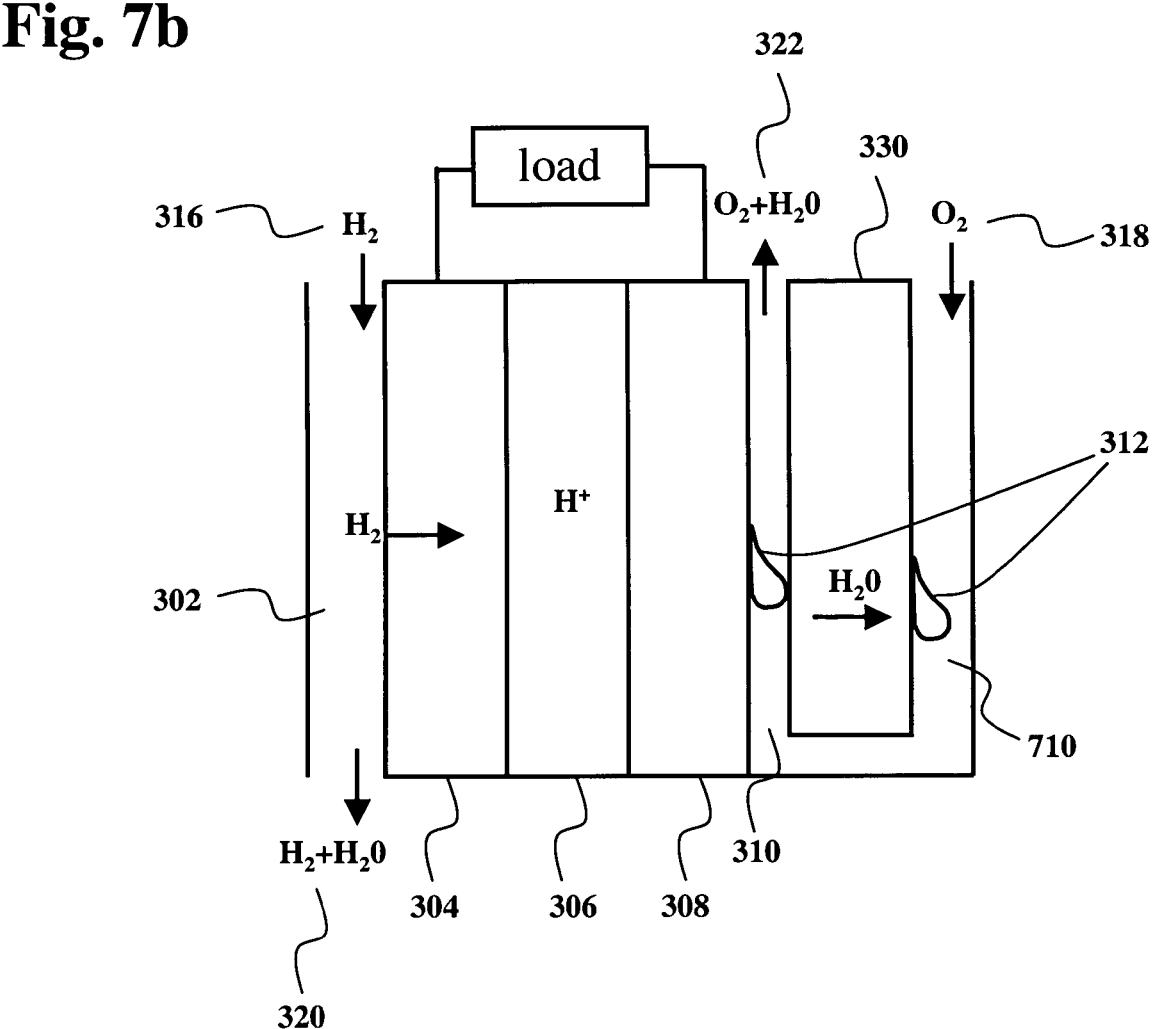
FIG. 7B shows an example of a fuel cell system.

FIG. 7B shows an example of a fuel cell system integrated with an electroosmotic pump 330 for humidification of a dry oxidant stream 318. The electroosmotic pump 330 transports liquid phase product water 312 from the cathode to a region 710, with one or more channels, in contact with a dry oxidant stream 318. The oxidant leaves the humidification channel 710 saturated with water vapor, travels through the oxidant channel 310 and reacts at the cathode 308 to produce electrical current.

Figure 7C:
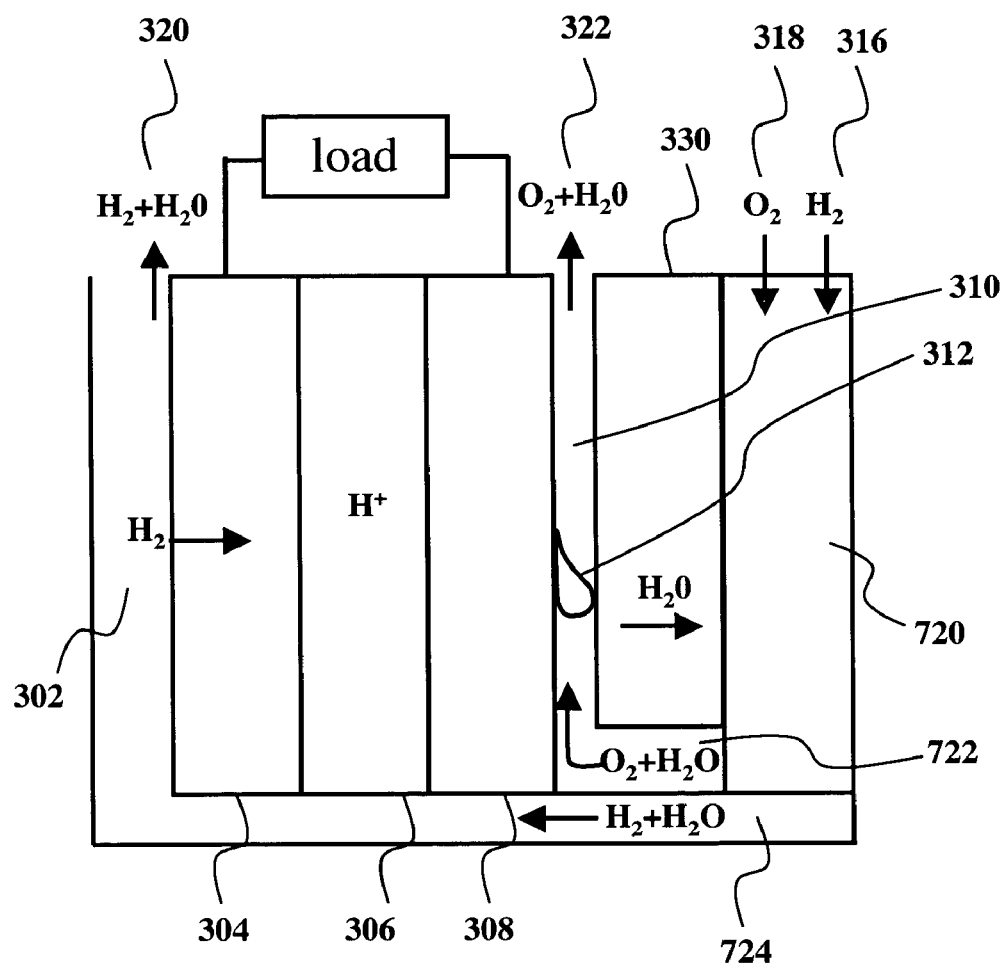
FIG. 7C shows an example of a fuel cell system.
Figure 7D:
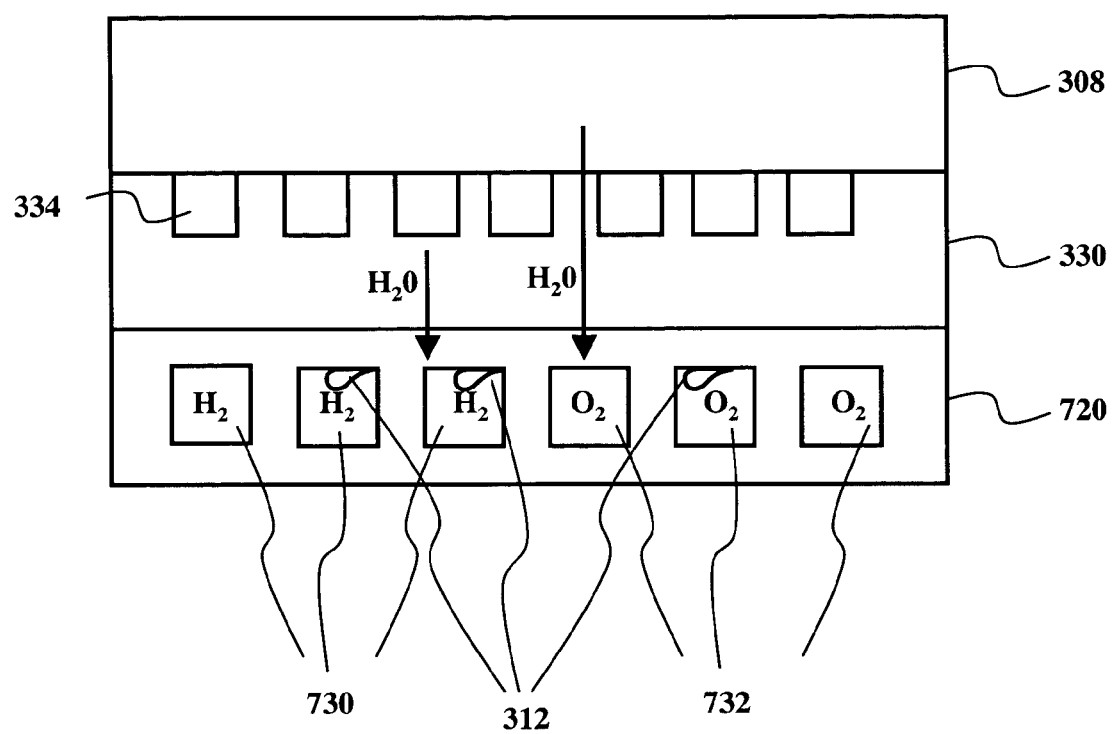
FIG. 7D shows an example of a channel network plate.

FIG. 7C shows an example of a fuel cell system integrated with an electroosmotic pump 330 for humidification of both dry hydrogen 316 and dry oxidant 318. The EO pump 330 transports liquid phase product water 312 from the cathode to a channel network plate 720 through which the dry reactants flow. The channel network plate 720 may have porous regions such that the water can be transported through the plate to the dry reactant channels. The reactants leave the channel plate saturated with water vapor through individual conduits 722, 724 travel through the oxidant 310 and hydrogen channels 302 to react at the cathode 308 and anode 304. The reactants are isolated from each other by a gas impermeable membrane. FIG. 7D shows one example of the channel network plate 720 for humidification of dry reactant streams. The dry oxidant and dry hydrogen enter the channel plate 720 through one or more individual channels 732 and 730, respectively. The saturated oxidant flows across the cathode surface through one or more channel in or adjacent to the EO pump 330.

Figure 8:
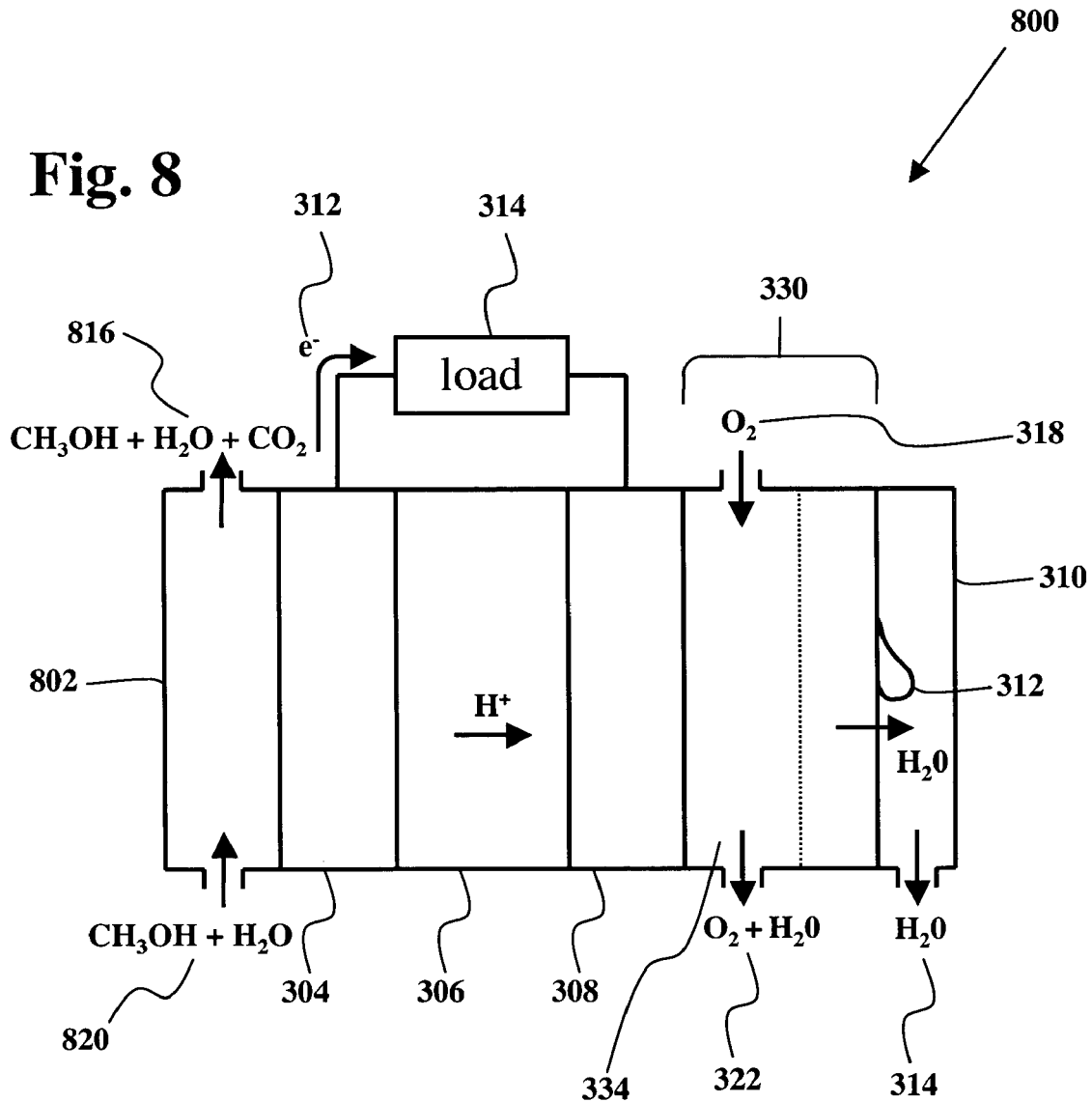
FIG. 8 shows an example of a direct methanol fuel cell with an electroosmotic pump.

FIG. 8 shows an example of a direct methanol fuel cell integrated with an electroosmotic pump 330. This fuel cell is similar to the fuel cell 300 in FIG. 3, except that methanol and water are used as a fuel source instead of hydrogen gas. The DMFC 800 contains an electroosmotic pump 330 layer in between the cathode 308 layer and the output water duct 310. The pump 330 contains one or more channels 334 for supplying the input oxidant 318 to the cathode 308. Output oxidant 322 exits the pump 330 via the channel 334. The pump 330 transports product water 312 to or from the cathode 308 into or from the duct 310. Excess water 314 exits the system. The input reactant stream 820 made up of methanol and water enters the reactant duct 802. The output reactant stream 816 is made up of carbon dioxide, water, and unconsumed methanol and exits the duct 802.

Water management is important to fuel cell performance in DMFC's. The transport mechanisms are similar to those in PEM HFC's except that there is no evaporation and condensation of water on the anode side of the cell. Another challenge in DMFC's is managing the methanol-water liquid fuel mixture. Higher energy densities can be obtained when pure methanol is stored and optimal operation of PEM DMFC's is achieved with methanol concentrations near 3M. For these reasons, it is advantageous to reclaim the product water at the cathode and to mix with the stored pure methanol and depleted methanol-water mixture that exits the anode 220.

Figure 9:
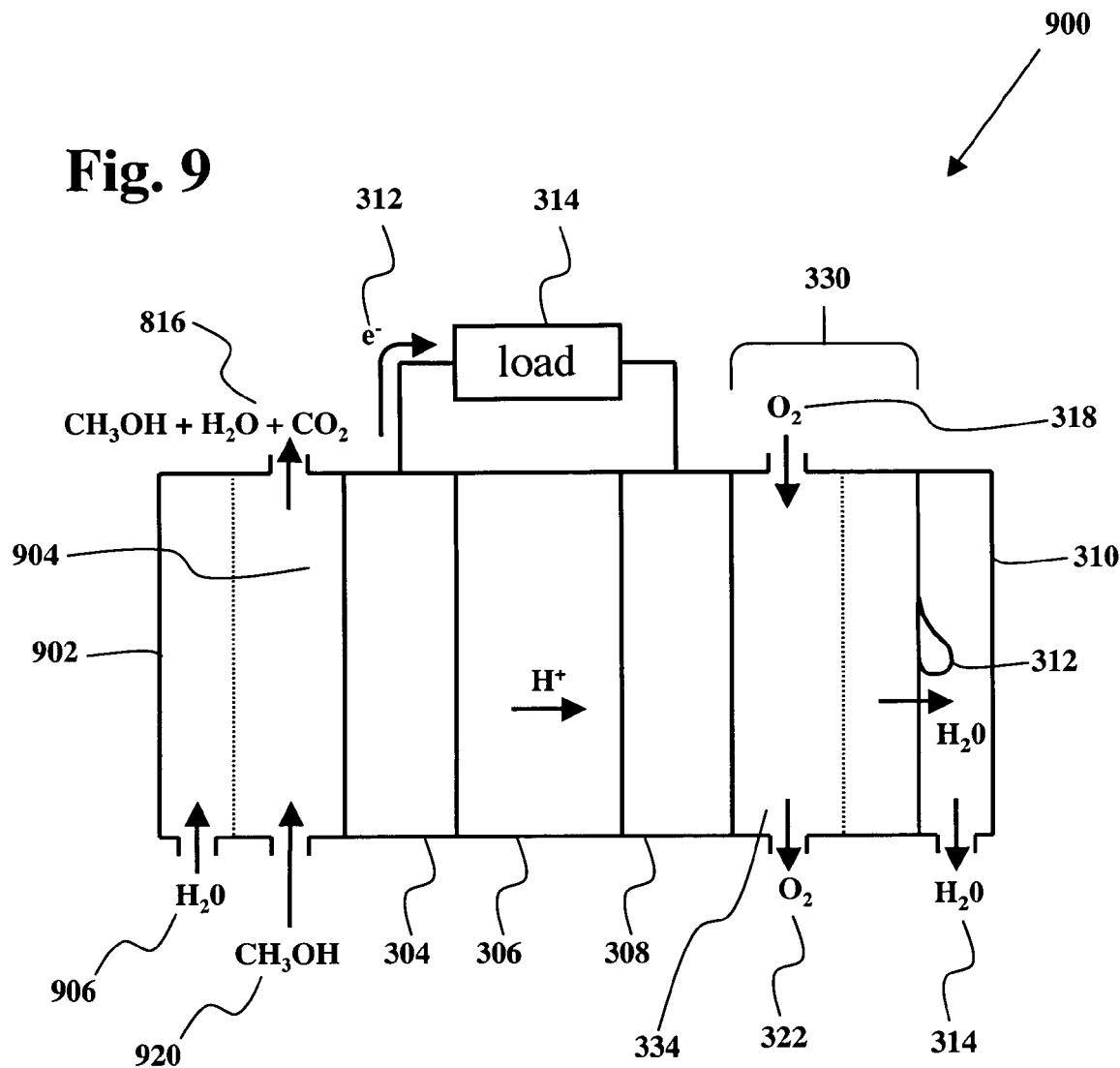
FIG. 9 shows an example of a direct methanol fuel cell with an electroosmotic pump.

FIG. 9 shows an example of a DMFC integrated with one or more EO pumps. The fuel cell 900 is similar to the cell 800 shown in FIG. 8, except that it has a second electroosmotic pump 902 located near or adjacent to the anode. The pump 902 may have one or more channels 904 for receiving pure methanol (or a mixture of methanol and water) 920. The channels 904 transport the reactant mixture to the anode 304 and the waste stream 816 from the anode 304, respectively. The pump 902 supplies water, pure methanol, or a methanol water mixture 906 to the anode side of the fuel cell 900 to optimize performance of the fuel cell.

Figure 10:
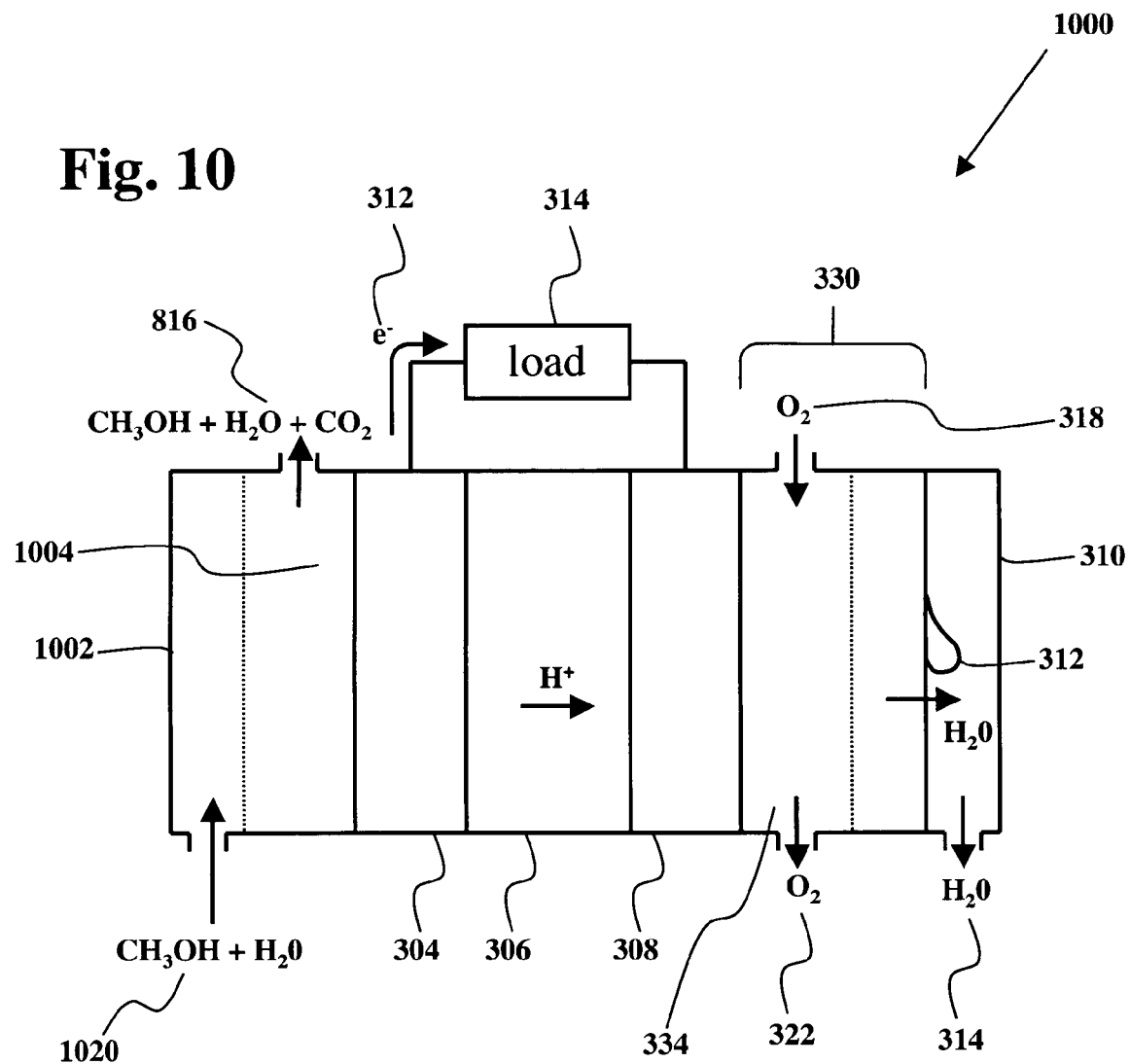
FIG. 10 shows an example of a direct methanol fuel cell with an electroosmotic pump.

FIG. 10 shows an example of a direct methanol fuel cell. The fuel cell 1000 is similar to that shown in FIG. 9, except that the electroosmotic pump 1002 supplies the reactant mixture 1020 of methanol and water. This recirculating flow of reactant mixture inhibits the reduction of cell potential due to $CO_2$ gas buildup and methanol depletion in passively feed systems.

Figure 11:
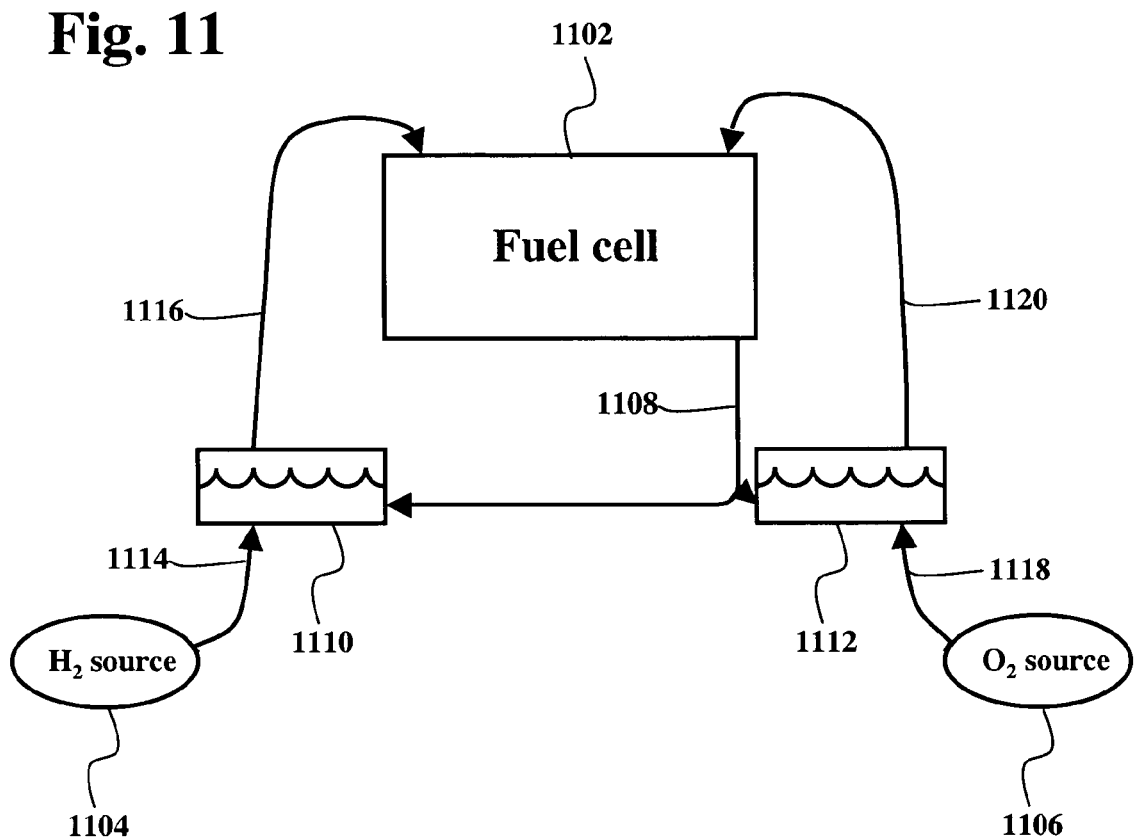
FIG. 11 shows an example of an apparatus used to humidify reactant streams.

FIG. 11 shows an example of a system that uses the water recovered by an electroosmotic pumped for humidification of hydrogen 316 and oxidant streams 318. The fuel cell 1102 may have the net production of water removed by an EO pump. The excess water is pumped via a conduit 1108 to two reactant humidifier water reservoirs 1110, 1112. Dry hydrogen is transported from its storage source 1104 to the humidification water reservoir 1110 via a conduit 1114. The dry hydrogen can be humidified at 1114 by variety of means such as sparging or atomization. Hydrogen saturated with water vapor flows to the hydrogen reactant inlet via 1116 to produce current in the fuel cell. Dry oxidant is transported from its storage source 1106, which may include air at local atmospheric pressure, to the humidification water reservoir 1112 via a conduit 118. The dry oxidant can be humidified at 1112 by variety of means such as sparging or atomization. Oxidant saturated with water vapor flows to the oxidant reactant inlet via 1120 to produce current in the fuel cell.

Figure 12:
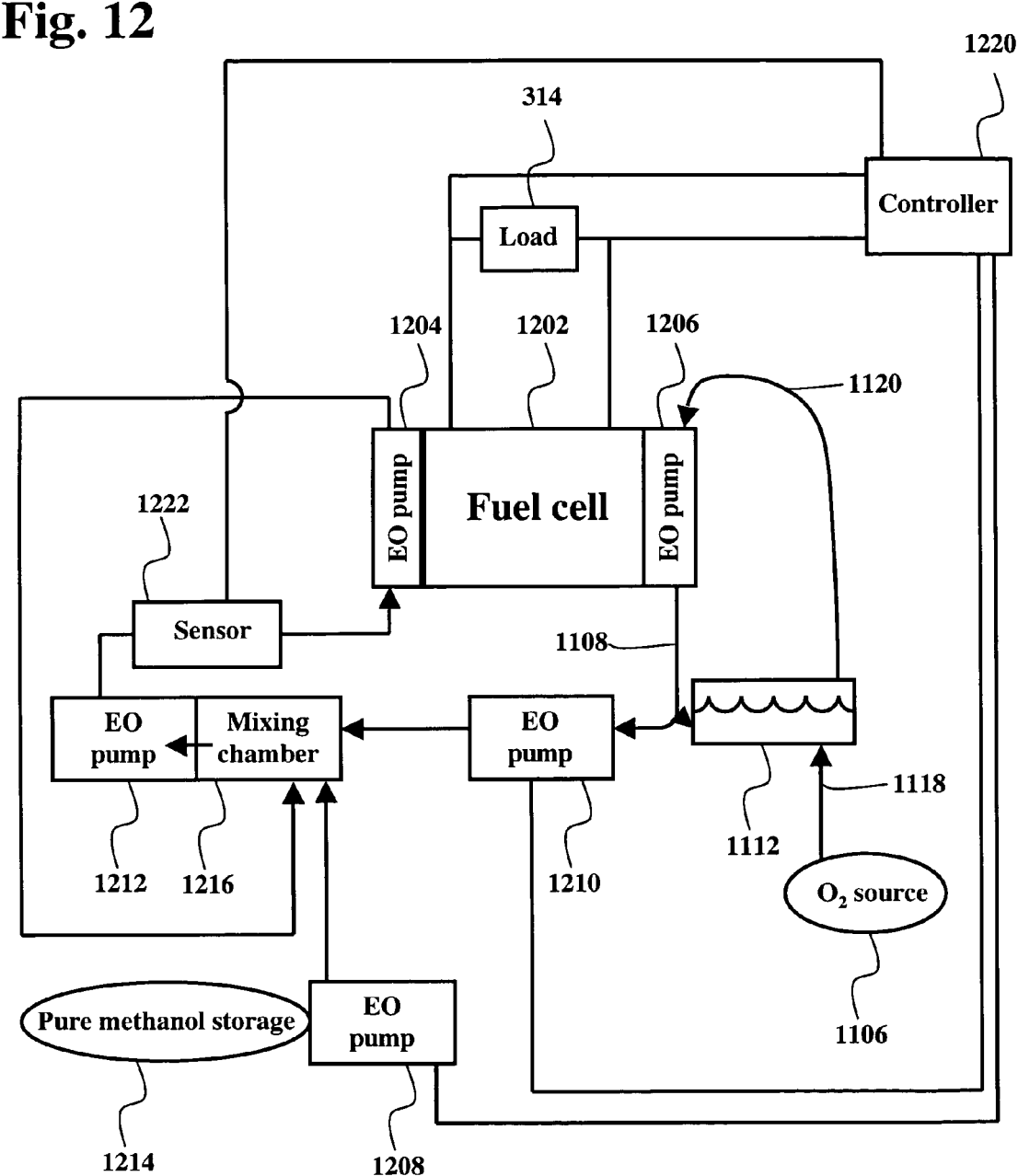
FIG. 12 shows an example of an apparatus to humidify and mix reactant streams in a direct methanol fuel cell.

FIG. 12 shows an example humidifying reactant and oxidant streams in a direct methanol fuel cell. The fuel cell 1202 may contain one or more electroosmotic pumps. A first electroosmotic pump 1204 may be employed to manage water and/or methanol at the anode side of the fuel cell 1202. A second electroosmotic pump 1206 may be used to manage water on the cathode side of the fuel cell 1202. A third electroosmotic pump 1208 may be employed to transport methanol from a methanol source 1204 to a mixing station 1216. A fourth electroosmotic pump may be used to transport product water 1108 to a humidifying device 1112 and/or a mixing chamber 1216. A fifth electroosmotic pump 1212 may be employed to pump a reactant mixture of methanol and water to the fuel cell 1202. It should be apparent that any combination of the various electroosmotic pumps 1204, 1206, 1208, 1210, 1212 may be employed. A controller may monitor the fuel cell potential or methanol concentration via a sensor 1222 and control one of more of the pumps 1204, 1206, 1208, 1210, 1212.

Figure 13:
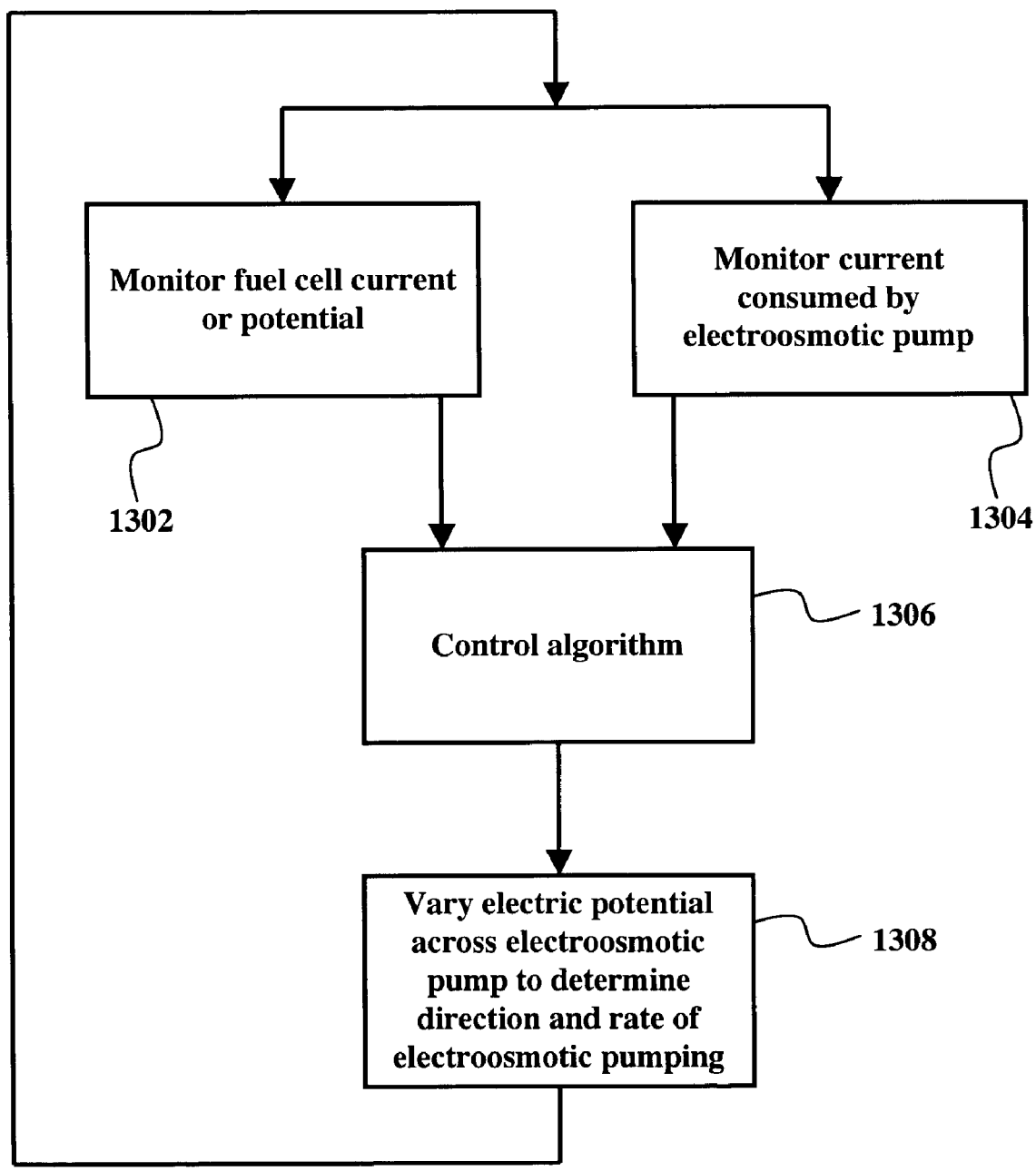
FIG. 13 shows an example of active water control.

FIG. 13 shows an example of active water control. In 1302, fuel cell current or potential is monitored. In 1304, current consumed by electroosmotic pump monitored. In 1306, a control algorithm receives inputs and sends a control signal. In 1308, electric potential across electroosmotic pump is varied to control the direction and rate of electroosmotic pumping.

The current consumed by an EO pump and/or the fuel cell electrical potential/current may be monitored and used as feedback to control the potential and bias across the EO pump. The bias and potential across the pump determine the direction and rate of water flux. A control algorithm may use one or more inputs to determine the EO pump potential and bias. The algorithm may be employed with an analog PID controller or other type of programmable digital controller.

Figure 14:
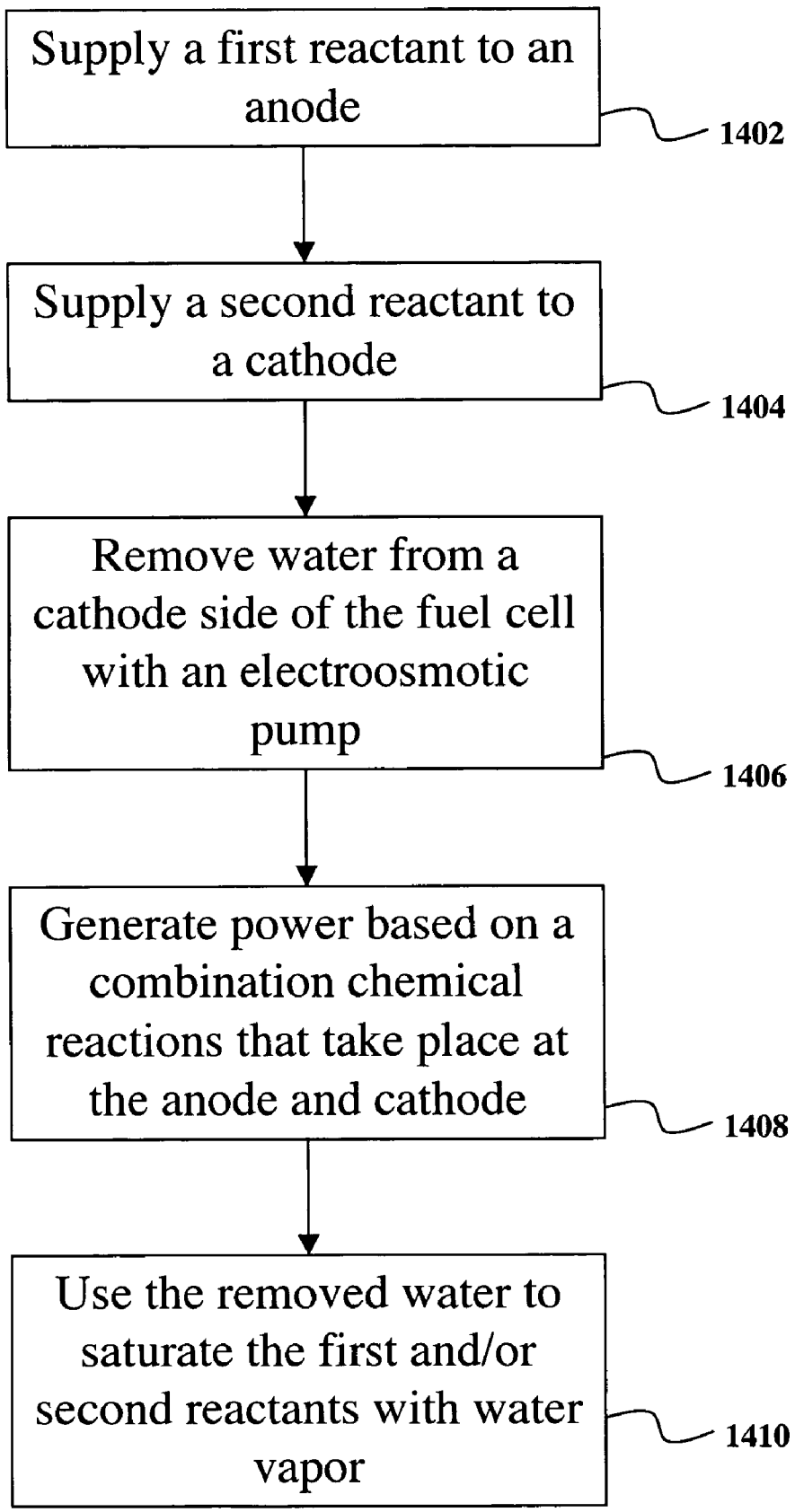
FIG. 14 shows an example of power generation.

FIG. 14 shows an example of power generation. In 1402 a first reactant is supplied to an anode. In 1404 a second reactant is supplied to a cathode. In 1406 water is removed from a cathode side of the fuel cell with an electroosmotic pump. In 1408 power is generated based on a combination of chemical reactions that take place at the anode and cathode. In 1410 the removed water is optionally used to saturate the first and/or second reactants with water vapor.

Figure 15:
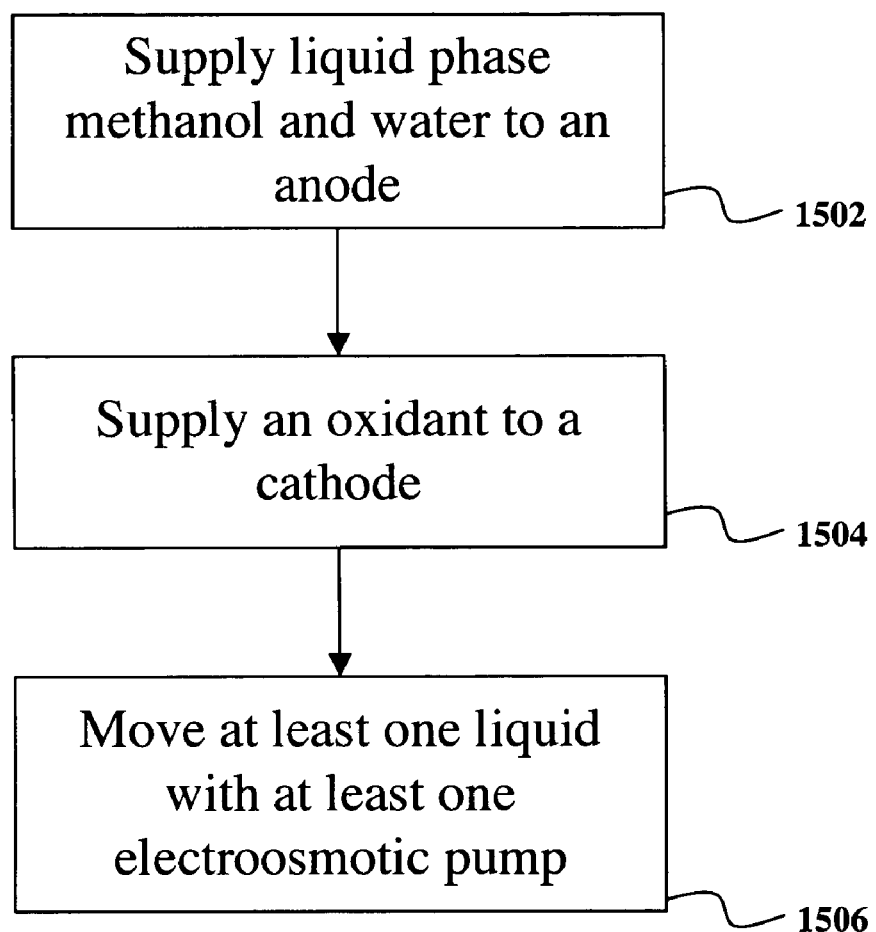
FIG. 15 shows an example of transporting liquids.

FIG. 15 shows an example of transporting liquids. In 1502 liquids phase methanol and water is supplied to an anode. In 1504 an oxidant is supplied to a cathode. In 1506 at least one liquid is moved with at least one electroosmotic pump.

Figure 16:
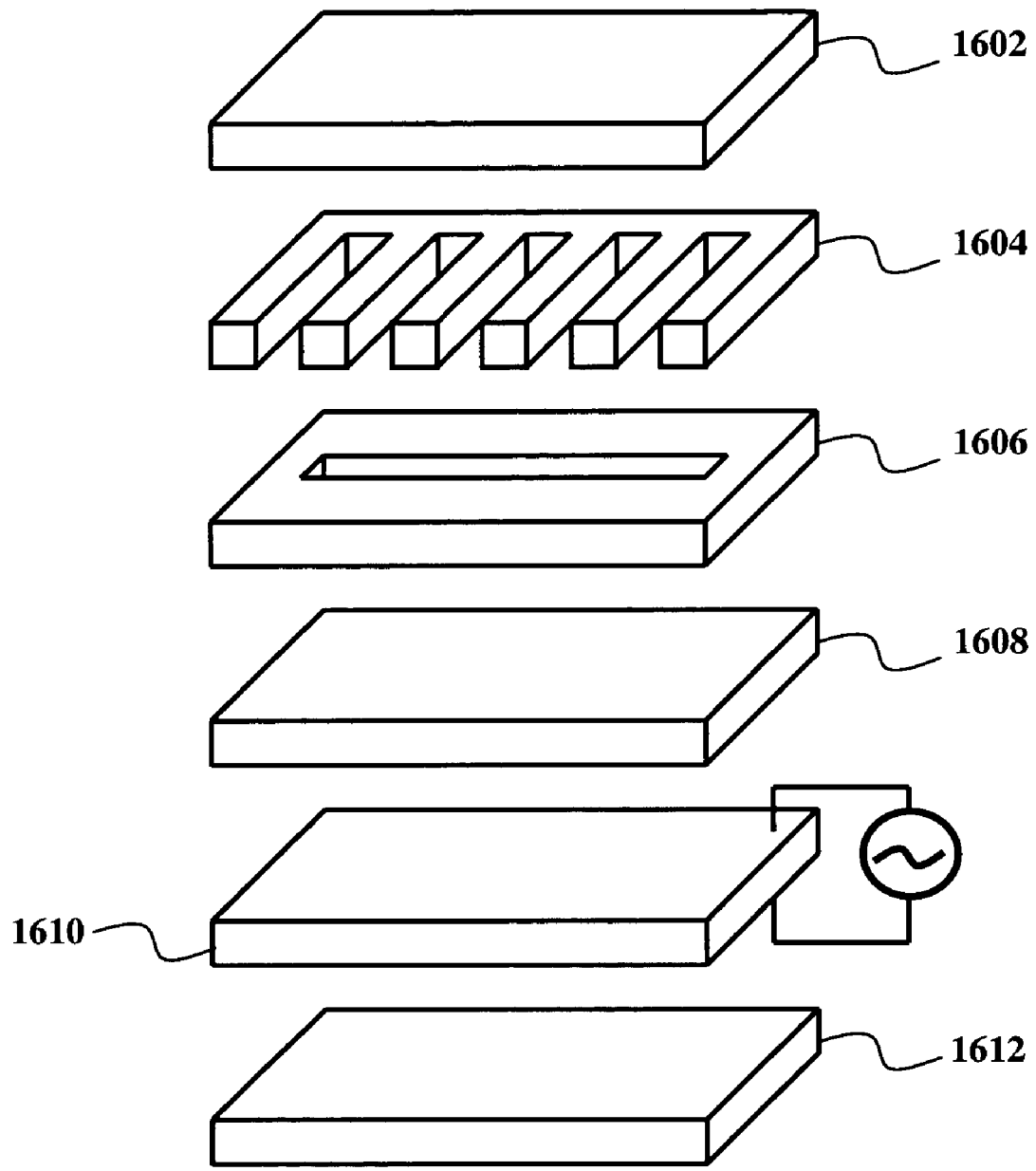
FIG. 16 shows an example of using an electroosmotic pump to pump an oxidant.

FIG. 16 shows an example of using an electroosmotic pump to transport an oxidant to a fuel cell. The layers are shown in the following order: a cathode 1602, an oxidant channel/current collector 1604, a manifold 1606, a top reservoir 1608, an electroosmotic pump 1610, and a bottom reservoir 1612. Not shown are an anode or membrane. With this arrangement, the pump 1610 transports water from the bottom reservoir 1612 to the top reservoir 1608 and through to the manifold 1606. Oxidant gas is displaced from the oxidant channels 1604 when water fills the manifold 1606, and is expelled from the fuel cell. The pump 1610 then pumps water out of the manifold 1606 and, optionally, the top reservoir 1608, thereby drawing fresh oxidant into the oxidant channel layer 1604. The cycle is then repeated. Thus, the action of the pump 1610 and water in the reservoirs 1608, 1612 acts as a sort of diaphragm that draws in and expels oxidant from the oxidant channels 1604. One might compare this system to a lung and diaphragm setup. The oxidant gas here may be regular air taken in from and expelling to the local atmosphere. This may reduce the electroosmotic pumping power, but may be advantageous to pump a liquid other than water. The interface between the air and pumping liquid may be a piston, fluid interface, or a membrane.

Figure 17:
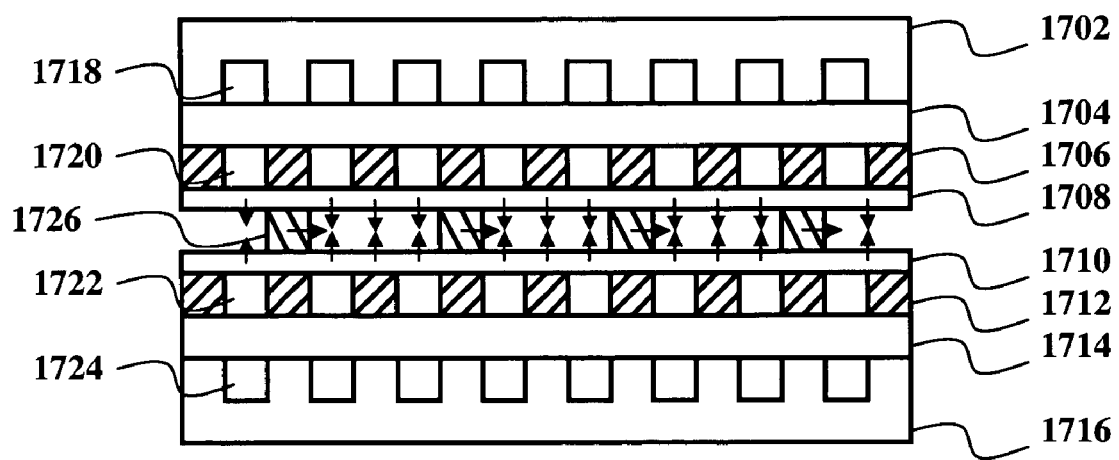
FIG. 17 shows an example of using planar and inline electroosmotic pumps in a stacked system.

FIG. 17 shows an example of using planar and nonplanar electroosmotic pumps in a stacked system. The various elements include an anode 1702 with multiple channels 1718, a membrane 1704, a cathode layer 1706 with multiple channels 1720, a top electroosmotic pump 1708, one or more horizontal electroosmotic pumps 1726, a bottom electroosmotic pump 1710, a cathode layer 1712 with multiple channels 1722, a membrane 1714, and an anode 1716 with multiple channels 1724. The anode channels 1718, 1724 receive a reactant such as hydrogen or a mixture of methane and water. The cathode channels 1720, 1722 receive an oxidant. The pumps 1708, 1710 transport product water from the cathode channels 1720, 1722 in a direction perpendicular to the plane comprising the interface of the pumps 1708, 1710 and their respective cathodes 1706, 1712. This perpendicular product water flow removes excess water from the oxidant channels 1720, 1722. In order to clear the product water from the stacked fuel cell arrangement, the horizontal pumps 1726 transport the product water in a direction parallel to the plane comprising the interface of the pumps 1708, 1710 and their respective cathodes 1706, 1712. Thus, by using electroosmotic pumps to transport water in planar and nonplanar directions, product water can be removed from a stacked fuel cell system.

The fuel cell stacked shown in FIG. 17 is that of two opposed fuel cells, where the layering of the anode-membrane-cathode differs from one fuel cell unit to the next. It is also possible to construct a fuel cell stack where the anode-membrane-cathode layering is consistent from one fuel cell unit to the next. In this case, the product water may be pumped from the cathode of one cell to the anode of the next. Alternatively, water may be pumped from both the anode and the cathode of each fuel cell unit to a reservoir and vice versa.

Figure 18A:
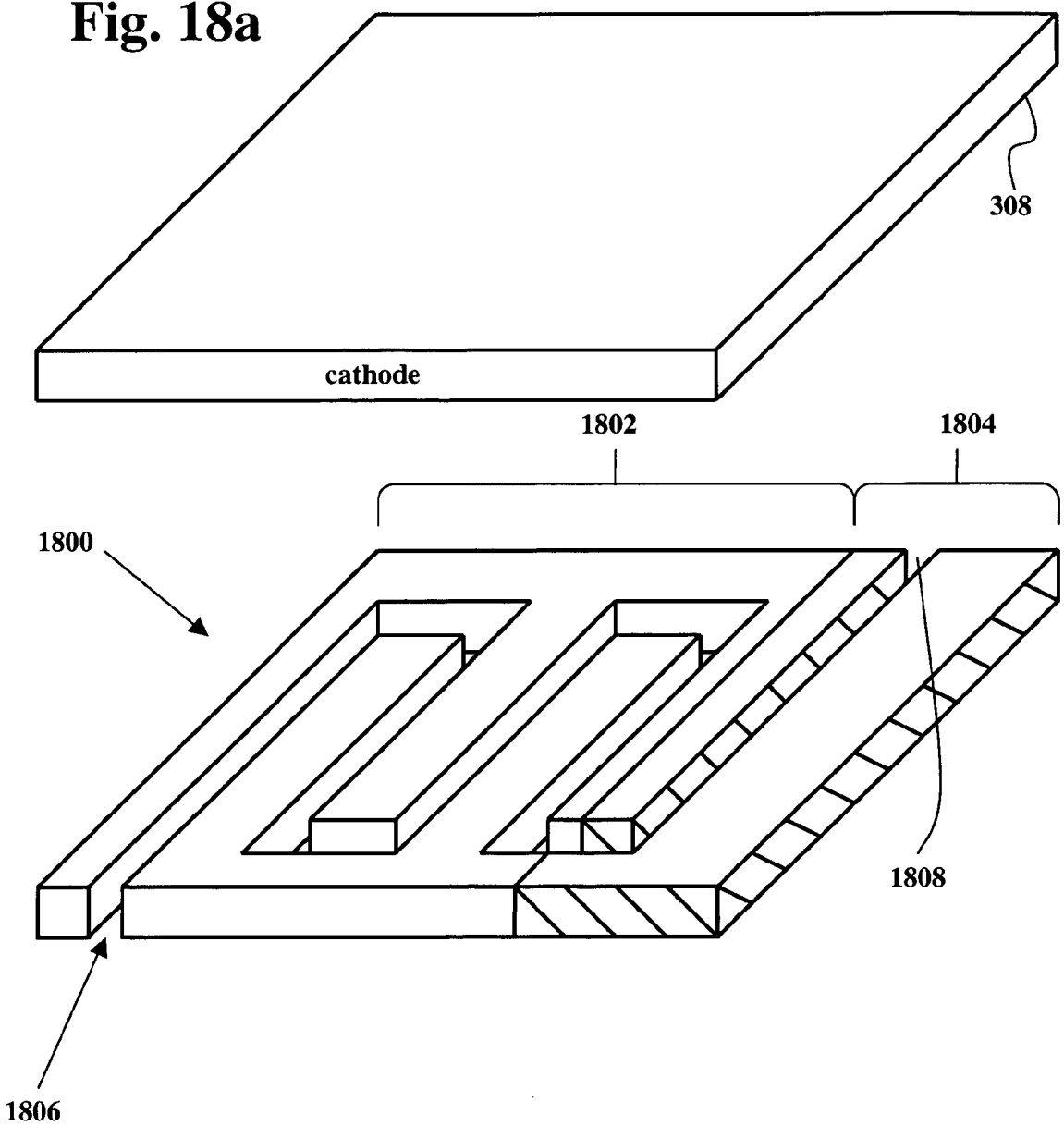
FIG. 18A shows an example of an oxidant channel layer.

FIG. 18A shows an example of an electroosmotic pump as part of an oxidant channel layer. The exploded view also shows a cathode 308. The various elements included in the channel layer 1800 are a solid gas delivery plate 1802 with channels (these plates are most often conductive and serve as the current collector), an electroosmotic pump portion 1804, a channel inlet 1806, and a channel outlet 1808. In this arrangement, an oxidant flows into the channel inlet 1806, through the serpentine path of the channel, and exits through the channel outlet 1808. The flow of the oxidant through the channel moves the product water through the channel in the direction of the oxidant. In a channel layer without an electroosmotic pump 1804, water accumulation near the outlet 1808 can seriously inhibit the oxidant flow and significantly decrease the transport of oxidant to the cathode. By using the pump 1804 in proximity to the outlet 1808 the product water can be removed perpendicular to the plane the plate. The advantage by having the EO pump 1804 only a fraction of the size of the layer 1800 is that the standard portion 1802 of the layer 1800 conducts the fuel cell current and thus should be constructed in a way to minimize electrical resistance. This arrangement is advantageous, because the EO pump medium portion 1804 is a relatively poor electrical conductor.

Figure 18B:
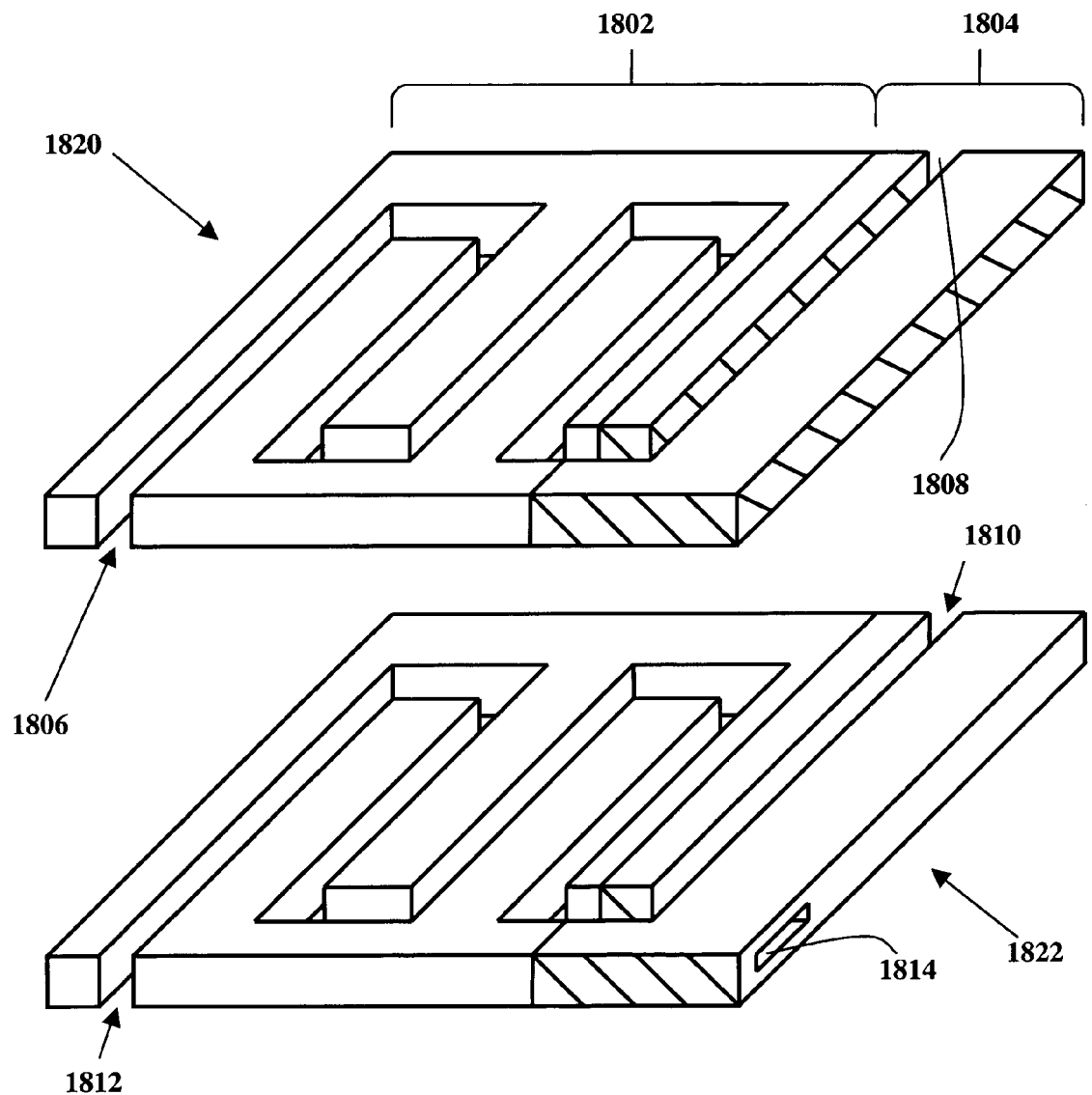
FIG. 18B shows another example of an oxidant channel layer.

FIG. 18B shows another example of an oxidant channel layer. In this case the channel plates 1820, 1822 are in a bipolar configuration. The exploded view shows the two channel plates 1820, 1822, but does not show the cathode 308 or anode 304. The cathode 308 would be above the top plate 1820. The anode 304 for the next fuel cell unit would be below the bottom plate 1822. Also not shown is a partial layer that prevents reactant and oxidant streams from mixing between the top and bottom channel plates 1820, 1822.

In this configuration the liquid product water can be pumped from the cathode 308, where it is normally in excess, to the anode 304 where it can be evaporated in the dry hydrogen stream 316. In this configuration it may be advantageous to flow the reactant stream opposite that of the oxidant stream such that the dry hydrogen inlet 1810 is near the oxidant saturated with product water 1808. Excess product water may alternatively be rejected from the system through the port 1814. This bipolar reactant delivery plate with fraction EO pumping surface may be advantageous for fuel cell stacks. This design also minimizes the electrical resistance of the current collection plate.

Figure 19:
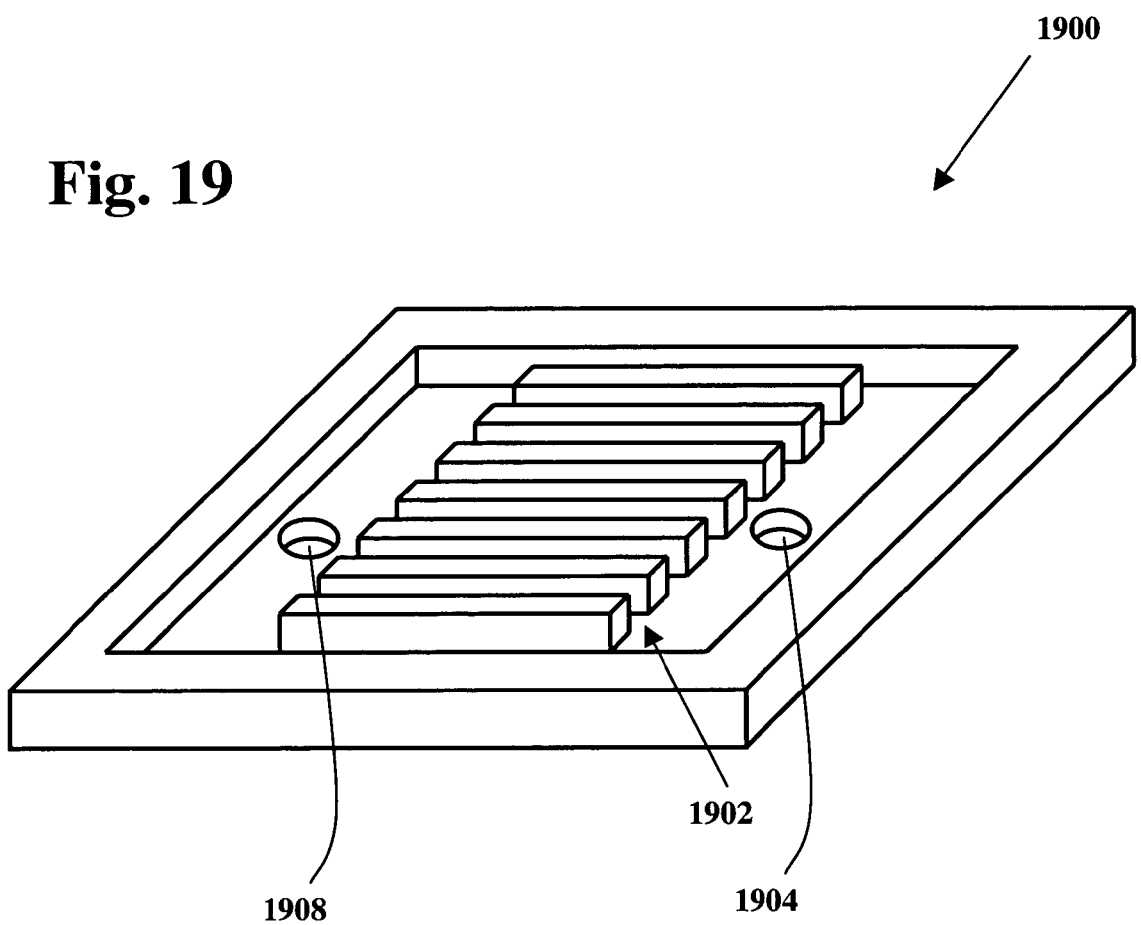
FIG. 19 shows an example of an electroosmotic pump with parallel reactant gas channels.

FIG. 19 shows an example of an electroosmotic pump. The pump 1900 has one or more channels 1902 that allow a reactant or oxidant to flow past an anode or cathode. An inlet 1904 and outlet 1908 allow the flow through the pump. One will note that the path of travel from the inlet 1904 to the outlet 1906 is a much more direct, parallel path than the path from the channel inlet 1806 to the outlet 1808 as shown in FIG. 18. A parallel channel arrangement usually saves a great deal of energy when compared to a serpentine arrangement.

Figure 20:
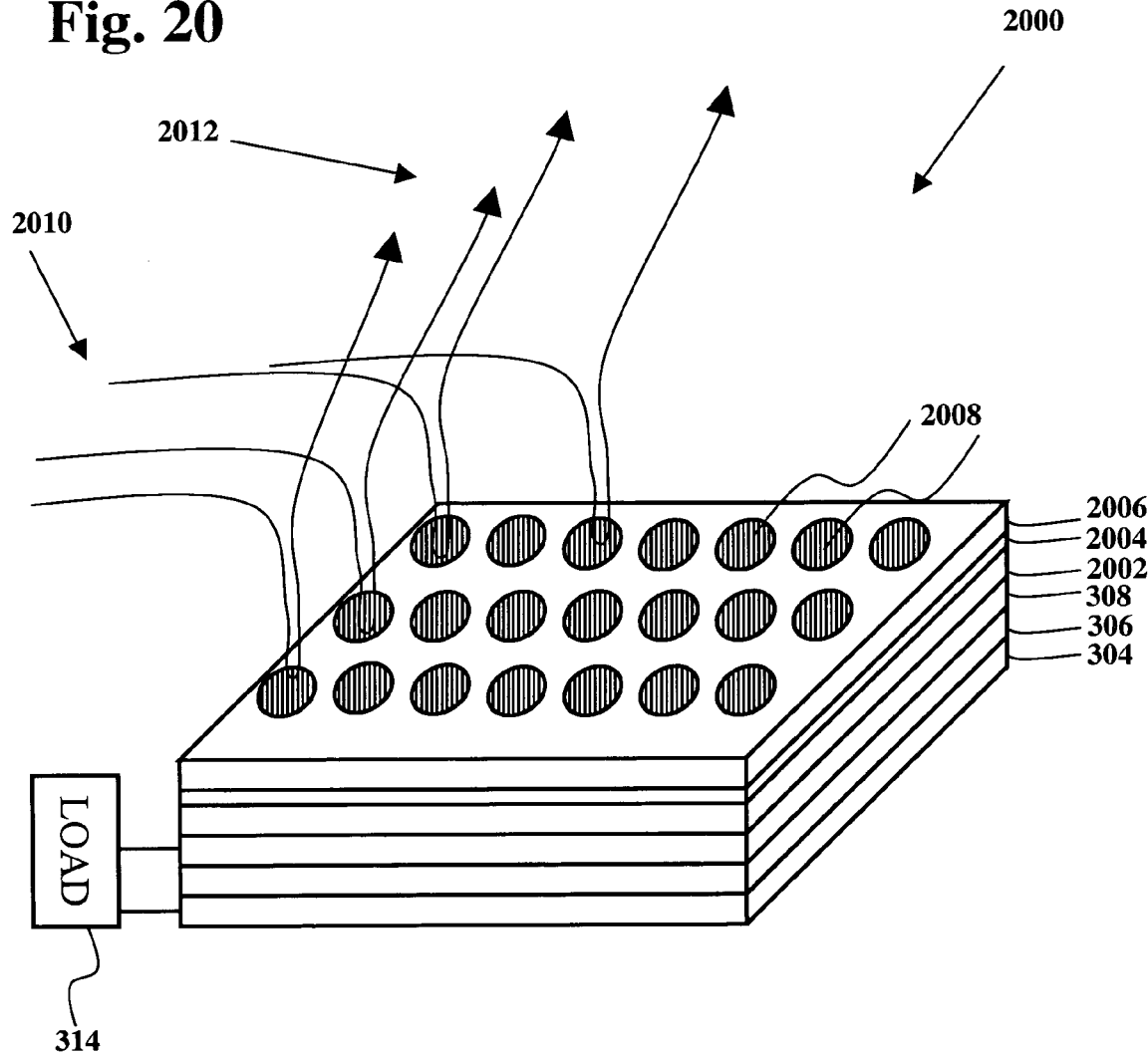
FIG. 20 shows an example of an air-breathing fuel cell with embedded electroosmotic pump.

FIG. 20 shows an example of an air-breathing fuel cell with an embedded electroosmotic pump. The air-breathing fuel cell 2000 comprises an anode 304 supplied with an input reactant, (e.g., humidified hydrogen, methanol-water mixture), an ion permeable membrane 306, a fuel cell cathode 308, a porous substrate 2002, an EO pump 2004, and a large surface area hydrophilic water evaporation layer 2006. The cathode 308 is comprised of a catalyst layer, a cathode gas diffusion layer, and a cathode current collector. The porous substrate 2002 may be made from a material that is electrically conductive, such as graphite or stainless steel, to collect fuel cell current. The porous substrate 2002 may be coated with an inert layer, such as gold or platinum, to prevent oxidation and corrosion. Parts of the cathode 308 are exposed to the ambient air through a series of orifices 2008 through the porous substrate 2002, EO pump cathode 308, as well as the water evaporation layer 2006. Consequently, the oxygen 2010 in the ambient air can freely diffuse through the orifices 2008 to the fuel cell cathode 308. The oxygen depleted air 2012 returns to the environment.

Figure 21:
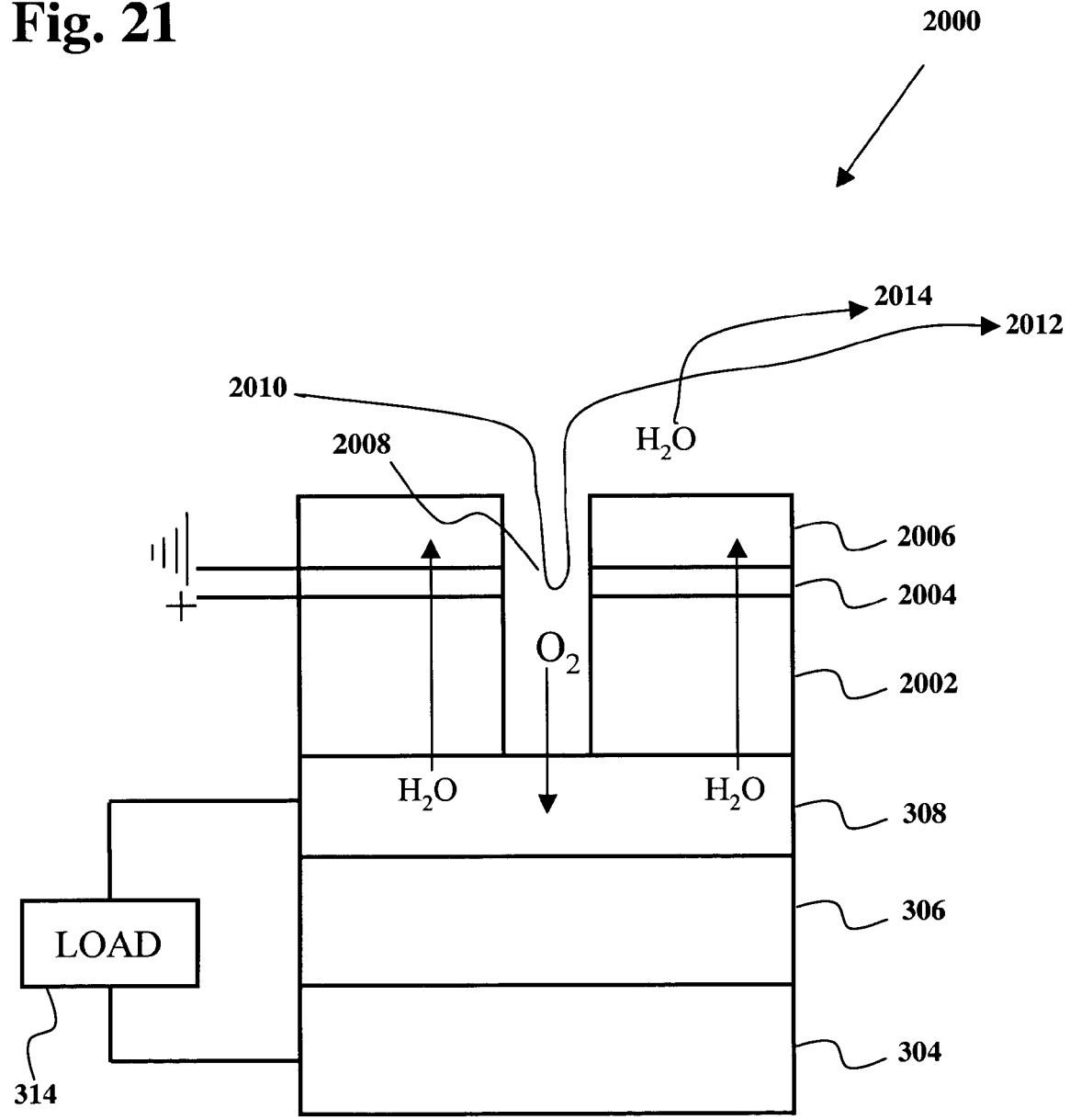
FIG. 21 displays a partial cross-section of the air-breathing fuel cell with embedded electroosmotic pump.

FIG. 21 displays a partial cross-section of the air-breathing fuel cell. In this embodiment the oxygen from the ambient air reacts at the cathode 308 with protons and electrons to form product water. This product water is then wicked into a porous substrate 2002 that may serve as both the fuel cell current collector and the EO pump anode. The product water in the porous substrate 2002 is pumped by the EO pump 2004 to the hydrophilic high surface area evaporation layer 2006. The product water in the high surface area layer 2006 evaporates to the environment 2014.

It will be apparent to one skilled in the art that the described embodiments may be altered in many ways without departing from the spirit and scope of the invention. Accordingly, the scope of the invention should be determined by the following claims and their equivalents.

What is claimed is:

1. A fuel cell and electroosmotic pump system comprising:
   a fuel cell anode;
   a fuel cell cathode; and
   at least one electroosmotic pump, wherein said electroosmotic pump is is disposed to draw liquid to or from said fuel cell cathode, wherein said electroosmotic pump comprises a first pump electrode and a second pump electrode, wherein said first pump electrode comprises said fuel cell cathode.

2. The system of claim 1, wherein said electroosmotic pump displaces water in a direction perpendicular to said oxidant flow path.

3. The system of claim 1, wherein said fuel cell anode is said electroosmotic second electrode, wherein a number of said electrodes in said system are reduced.

4. The system of claim 1, wherein more than one said fuel cell is connected in series.

5. The system of claim 1, wherein more than one said fuel cell is connected in parallel.

6. The system of claim 1, wherein said electroosmotic pump displaces water in a direction perpendicular to said planes of said fuel cell.

7. The system of claim 1, wherein said electroosmotic pump disposed adjacent to the cathode displaces water in a direction parallel to said planes of said fuel cell.

8. The system of claim 1, wherein said electroosmotic pump is disposed to draw liquid to or from said fuel cell cathode and further drives a reactant gas to said cathode.

9. The system of claim 1, wherein said electroosmotic pump is disposed adjacent to said fuel cell cathode further comprises hydrogen supplying integrated channels for supplying hydrogen to said fuel cell anode.

10. The system of claim 9, wherein said electroosmotic pump further comprises water removal integrated channels for removing water from the said hydrogen supplying integrated channels.

11. The system of claim 9, wherein said electroosmotic pump transports water to said hydrogen supplying integrated channels to humidify dry hydrogen.

12. The system of claim 1, wherein said system further comprises said electroosmotic pump that is in contact with said fuel cell anode to supply a liquid reactant mixture to said fuel cell anode.

13. The system of claim 12, wherein said electroosmotic pump in contact with said fuel cell anode has channels for supplying said liquid reactant mixture to said fuel cell anode.

14. The system of claim 1, wherein said fuel cell anode contains nonporous channel structures, wherein said nonporous channel structures said fuel cell anode with a liquid reactant mixture, wherein said system further comprises an electroosmotic pump for delivering said liquid reactant mixture to said nonporous anode channels, wherein said electroosmotic pump for delivering said liquid reactant mixture comprises a layer of said system.

15. The system of claim 14, wherein said electroosmotic pump for delivering said liquid reactant mixture pumps a liquid, wherein said pumped liquid displaces said liquid reactant mixture.

16. The system of claim 15, wherein said system further comprises an interface between said pumped liquid and said displaced liquid reactant, wherein said interface is an interface selected from the group consisting of a membrane, a gas bubble, a meniscus, a diaphragm and a piston.

17. The system of claim 1, wherein said fuel cell anode comprises a catalyst layer, a gas diffusion layer, and a current collection layer.

18. The system of claim 1, wherein said fuel cell cathode comprises a catalyst layer, a gas diffusion layer, and a current collection layer.

19. The system of claim 1 further comprises a fuel cell membrane, wherein said fuel cell membrane is an ion selective membrane.

20. The system of claim 19, wherein said membrane is a solid polymer electrolyte.

21. The system of claim 1, wherein said electroosmotic pump is disposed adjacent to said fuel cell cathode and has channels for supplying an oxidant to said fuel cell cathode.

22. The system of claim 21, wherein said channels are lined with a porous conductive layer.

23. The system of claim 21, wherein said channels are parallel to a plane, wherein said plane comprises an interface between said fuel cell cathode and said electroosmotic pump disposed adjacent to said fuel cell cathode.

24. The system of claim 1, wherein said electroosmotic pump comprises a porous glass frit.

25. The system of claim 1, wherein said electroosmotic pump comprises a glass fiber cloth.

26. The system of claim 1, wherein said electroosmotic pump comprises a porous polymer layer.

27. The system of claim 1, wherein said electroosmotic pump comprises a porous silicon layer.

28. The system of claim 1, wherein said electroosmotic pump comprises a porous aluminum oxide layer.

29. The system of claim 1, wherein cathode current is collected with a porous conductive layer, wherein said porous conductive layer is disposed as a lining to said fuel cell cathode.

30. The system of claim 1, wherein cathode current is collected with wires.

31. The system of claim 1, wherein cathode current is collected with a porous metallic foil.

32. The system of claim 1, wherein said electroosmotic pump is disposed adjacent to said fuel cell cathode and removes water directly from a gas diffusion layer.

33. The system of claim 1, wherein said electroosmotic pump is disposed adjacent to said cathode and transports water to/from said fuel cell cathode, and wherein said electroosmotic pump disposed adjacent to fuel cell cathode displaces an oxidant stream.

34. The system of claim 33, wherein said oxidant is air.

35. The system of claim 33, wherein said oxidant is oxygen enriched air.

36. The system of claim 1, wherein at least part of an outside surface of said electroosmotic pump comprises a porous conductive layer.

37. The system of claim 36, wherein said porous conductive layer is porous platinum.

38. The system of claim 1, wherein said electroosmotic pump is hydrophilic and self priming.

39. The system of claim 1, wherein said electroosmotic pump is self regulating.

40. The system of claim 1, wherein reactant gases are hydrated with water vapor using water removed by said electroosmotic pump.

41. The system of claim 1, wherein said system is a direct methanol fuel cell, and reaction product water removed by said electroosmotic pump is combined with methanol as a reactant stream.

42. The system of claim 1, wherein said electroosmotic pump is proximate a product water outlet.

43. The system of claim 42, wherein a planar area of said electroosmotic pump disposed adjacent to said fuel cell cathode is a fraction of a planar area of a fuel cell membrane, wherein an electrical resistance associated with a current flowing from said system to a second stacked said system is minimized.

44. The system of claim 1, wherein said electroosmotic pump removes water through a porous cathode current collector layer.

45. The system of claim 1, wherein said fuel cell cathode comprises a cathode gas diffusion layer and cathode catalyst layer, wherein a fraction of a cathode gas diffusion layer and a cathode catalyst layer are directly exposed to ambient air.

46. The system of claim 45, wherein a hydrophilic layer is placed on top of said electroosmotic pump.

47. The system of claim 1, wherein a fuel cell cathode current is collected with a metallic wire mesh.

* * * * *